(12) United States Patent　　(10) Patent No.: US 9,410,004 B2
Asano et al.　　(45) Date of Patent: Aug. 9, 2016

(54) AROMATIC POLYETHERSULFONE MICROPARTICLES HAVING NARROW PARTICLE DIAMETER DISTRIBUTION INDEX

(71) Applicant: Toray Industries, Inc., Tokyo (JP)

(72) Inventors: Itaru Asano, Nagoya (JP); Yuji Echigo, Nagoya (JP); Hiroshi Takezaki, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/962,653

(22) Filed: Aug. 8, 2013

(65) Prior Publication Data

US 2013/0337263 A1　　Dec. 19, 2013

Related U.S. Application Data

(62) Division of application No. 12/993,502, filed as application No. PCT/JP2009/059254 on May 20, 2009, now Pat. No. 8,574,669.

(30) Foreign Application Priority Data

May 21, 2008　(JP) ................................ 2008-132939
May 21, 2008　(JP) ................................ 2008-132940
Feb. 10, 2009　(JP) ................................ 2009-029175

(51) Int. Cl.
　　*B32B 5/16*　　(2006.01)
　　*C08F 120/44*　　(2006.01)
　　(Continued)

(52) U.S. Cl.
　　CPC .............. *C08F 120/44* (2013.01); *C08G 64/40* (2013.01); *C08G 65/46* (2013.01); *C08G 69/46* (2013.01);
　　(Continued)

(58) Field of Classification Search
　　CPC ....... C08G 75/23; C08J 2381/06; C08L 81/06; C08L 55/02
　　USPC .................................................... 428/402–407
　　See application file for complete search history.

(56) References Cited

U.S. PATENT DOCUMENTS 4,166,800 A　　9/1979　Fong
4,321,174 A　*　3/1982　Hoy et al. .................... 523/101

(Continued)

FOREIGN PATENT DOCUMENTS

CA　　1122077　　4/1982
CN　　1469753 A　　1/2004

(Continued)

OTHER PUBLICATIONS

A. Tuncel et al., "Electron Microscopic Observation of Uniform Macroporous Particles. I. Effect of Seed Latex Type and Diluent," Journal of Applied Polymer Science, vol. 71, 1999, pp. 2271-2290.

(Continued)

*Primary Examiner* — Holly Le
(74) *Attorney, Agent, or Firm* — DLA Piper LLP (US)

(57) ABSTRACT

A fine polymer particle production method includes producing an emulsion in a liquid prepared by dissolving and mixing a polymer A and a polymer B in organic solvents in which a solution phase composed primarily of the polymer A and a solution phase composed primarily of the polymer B are formed as separate phases, and bringing it into contact with a poor solvent for the polymer A to precipitate the polymer A. This method serves for easy synthesis of fine polymer particles with a narrow particle size distribution and the method can be effectively applied to production of highly heat-resistant polymers that have been difficult to produce with the conventional methods.

1 Claim, 3 Drawing Sheets

(51) Int. Cl.

| | | |
|---|---|---|
| *C08G 75/23* | (2006.01) | |
| *C08J 3/16* | (2006.01) | |
| *C08L 55/02* | (2006.01) | |
| *C08L 71/12* | (2006.01) | |
| *C08L 81/06* | (2006.01) | |
| *C08G 64/40* | (2006.01) | |
| *C08G 65/46* | (2006.01) | |
| *C08G 69/46* | (2006.01) | |
| *C08G 73/10* | (2006.01) | |
| *C08L 63/00* | (2006.01) | |
| *C08L 77/00* | (2006.01) | |
| *C08L 29/04* | (2006.01) | |
| *C08L 39/06* | (2006.01) | |

(52) U.S. Cl.
CPC ............ *C08G 73/1046* (2013.01); *C08G 75/23* (2013.01); *C08J 3/16* (2013.01); *C08L 55/02* (2013.01); *C08L 63/00* (2013.01); *C08L 71/12* (2013.01); *C08L 77/00* (2013.01); *C08L 81/06* (2013.01); *C08J 2339/06* (2013.01); *C08J 2381/06* (2013.01); *C08L 29/04* (2013.01); *C08L 39/06* (2013.01); *Y10T 428/2982* (2015.01)

(56) References Cited

U.S. PATENT DOCUMENTS

| | | | | |
|---|---|---|---|---|
| 4,459,378 | A * | 7/1984 | Ugelstad ........................ | 523/205 |
| 4,861,627 | A | 8/1989 | Mathiowitz et al. | |
| 5,496,897 | A * | 3/1996 | Yoshimatsu et al. .......... | 525/266 |
| 5,910,558 | A | 6/1999 | Schoenherr et al. | |
| 6,288,167 | B1 * | 9/2001 | Chen et al. ...................... | 525/71 |
| 6,508,910 | B2 | 1/2003 | Zhou et al. | |
| 6,562,935 | B1 * | 5/2003 | Harada .......................... | 528/171 |
| 7,217,762 | B1 * | 5/2007 | Jorgedal et al. ................ | 524/800 |
| 7,237,679 | B1 * | 7/2007 | Hendrickson .............. | B01J 2/04 209/638 |
| 8,574,669 | B2 * | 11/2013 | Asano et al. .................. | 427/212 |
| 2002/0103274 | A1 | 8/2002 | Satoh et al. | |
| 2003/0180363 | A1 | 9/2003 | Seo et al. | |
| 2004/0039171 | A1 | 2/2004 | Matsumoto et al. | |
| 2007/0054087 | A1 | 3/2007 | Smith et al. | |
| 2009/0280263 | A1 * | 11/2009 | Richter .................... | B29B 9/02 427/459 |
| 2011/0311816 | A1 * | 12/2011 | Kanomata et al. ............. | 428/402 |

FOREIGN PATENT DOCUMENTS

| | | |
|---|---|---|
| EP | 2 189 487 A1 | 5/2010 |
| JP | 50-44256 A | 4/1975 |
| JP | 54-055717 A | 5/1979 |
| JP | 59-066425 A | 4/1984 |
| JP | 63-075038 A | 4/1988 |
| JP | 1-158-042 A | 6/1989 |
| JP | 2-504025 A | 11/1990 |
| JP | 3-168217 A | 7/1991 |
| JP | 4-071081 B | 11/1992 |
| JP | 4-325590 A | 11/1992 |
| JP | 6-287271 A | 10/1994 |
| JP | 7-133328 A | 5/1995 |
| JP | 8-505180 T | 6/1996 |
| JP | 11-302569 A | 11/1999 |
| JP | 2000-080329 A | 3/2000 |
| JP | 2003-532688 T | 11/2003 |
| JP | 2004-149569 A | 5/2004 |
| JP | 2005-54023 | 3/2005 |
| JP | 2005-054153 A | 3/2005 |
| JP | 2005-162840 A | 6/2005 |
| JP | 2006-225525 | 8/2006 |
| JP | 2006-328218 A | 12/2006 |
| JP | 2007-231234 A | 9/2007 |
| JP | 2007-254727 A | 10/2007 |
| WO | 92/13027 | 8/1992 |
| WO | 2009/022591 A1 | 2/2009 |

OTHER PUBLICATIONS

"Nyuuka Bunsann Purosesu No Kino To Oyogijutsu," *Science Forum Inc.*, 1995, p. 91 and partial English translation (1 sheet).

Sumitomo Chemical, Sumikaexcel Pes Powder Grades, pp. 1-6, 2010.

D. Cochin, et al., "Emulsion Polymerization of Styrene Using Conventional, Polymerizable, and Polymeric Surfactants. A Comparative Study," Macromolecules 1997, 30, 2278-2287.

\* cited by examiner

Polyamide TR55
/Polyvinyl alcohol PVA
/N-methyl-2-pyrolidone NMP

AROMATIC POLYETHERSULFONE MICROPARTICLES HAVING NARROW PARTICLE DIAMETER DISTRIBUTION INDEX

TECHNICAL FIELD

This disclosure relates to a method of producing fine polymer particles, and more specifically, it relates to a method of easily producing fine polymer particles with a narrow particle diameter distribution, and fine polymer particles produced therewith.

BACKGROUND

The above-mentioned fine polymer particles are fine particles of polymer, and these fine particles generally can have a wide range of diameters from several tens of nm to several hundreds of μm. Unlike polymer moldings such as film, fiber, injection moldings, and extrusion moldings, fine polymer particles are used for modification and improvement of various materials by making use of the large specific surface area and the structure of fine particles. Their major uses include modifying agents for cosmetics, additives for toners, rheology modifying agents for paints, agents for medical diagnosis and examination, and additives for moldings such as automobile materials and construction materials. In particular, they have been in wider use in recent years owing to the advantageous fine particle structure of fine polymer particles, as material for rapid prototyping and rapid manufacturing, i.e., techniques to produce custom-made moldings using laser processing techniques.

As such fine polymer particles, furthermore, there are increasing demand in recent years for fine polymer particles that have high heat resistance, high solvent resistance, and uniform particle diameter distribution.

Conventional methods for producing common fine polymer particles can be roughly divided into two types: building-up processes such as emulsion polymerization and top-down processes such as mechanical crushing, melt kneading, dissolution-deposition, and emulsion-precipitation.

The major building-up processes include radical polymerization of vinyl polymers such as emulsion polymerization. Such radical polymerization processes have conventionally been in wide use for production of colloid particles, and they can produce particles from several tens of nm to several μm. Fine particles produced by radical polymerization have conventionally been studied as material; for modifying agents for ABS resin, spacer material for liquid crystal display, and emulsion paints, and thus, the method has been a general means of obtaining fine polymer particles.

The polymers that have been studied for these techniques, however, have been limited to vinyl polymers produced from acrylic, or styrene resin as input material, and they have some problems such as poor heat resistance, i.e., resistance to temperatures up to only about 150° C. (Japanese Unexamined Patent Publication (Kokai) No. 2007-254727, Japanese Examined Patent Publication (Kokoku) No. HEI-4-71081 and Japanese Unexamined Patent Publication (Kokai) No. HEI-7-133328). It is generally possible to produce these fine vinyl polymer particles with a relatively uniform particle diameter distribution in the submicronic range. Their particle diameter distribution tends to become larger, however, when production of particles of 500 nm or more is attempted and, therefore, particle diameter control with a special technique is necessary to obtain a narrow particle diameter distribution. Such special particle diameter control techniques include the dispersion polymerization method that focuses on solubility and the macromonomer method that uses an initiator with special characteristics (Journal of Applied Polymer Science, Vol. 71, 2271-2290 (1990) and Japanese Unexamined Patent Publication (Kokai) No. 2004-149569). These techniques, however, are also limited to vinyl polymers, and difficult to apply to a wide range of polymers.

One of the major top-down processes is the mechanical crushing method, which can be performed easily. With this technique, polymer pellets, etc. are mechanically crushed after being frozen in liquid nitrogen, etc.

However, that technique requires freezing of the polymer. This leads to a larger energy cost, and the resulting crushed particles generally have random shapes. The currently available processes, furthermore, can achieve an average particle diameter only down to a lower limit of about 1 μm, and it is extremely difficult to pulverize polymer material to a smaller size.

The melt kneading method (Japanese Unexamined Patent Publication (Kokai) No. 2005-162840), dissolution-deposition method (Japanese Unexamined Patent Publication (Kokai) No. 2005-054153), the emulsion method, etc., have been developed to provide techniques to produce spherical fine polymer particles.

The melt kneading method described in JP '840 uses an extrusion molding machine. In this production method, a medium component incompatible with the polymer is melt-knead at a high temperature to form a sea-island structure, and then the sea component is dissolved to take out the internal particles. The melt kneading method has some problems. It requires a high temperature, and the resulting fine particles tend to have a wide particle diameter distribution. Furthermore, kneading has to be performed under high-viscosity conditions, and this makes it difficult to largely decrease the average particle diameter.

In the dissolution-deposition described in JP '153, a polymer is heated under the existence of a solvent up to a high temperature to form a polymer solution, which is then cooled to produce fine particles. In that technique, however, the output is limited to the solubility of the polymer in the solvent and, in many cases, it is disadvantageous in terms of productivity.

Generally known for long is the emulsion method in which a polymer or a precursor of a thermosetting polymer is dissolved in an organic solvent, or a polymer is melted, and the resulting solution or melt is combined with water to provide an emulsion which is subsequently processed into polymer particles while maintaining the shape. Based on the emulsion method, Japanese Unexamined Patent Publication (Kokai) No. SHO-63-75038, etc. have proposed a process that comprises dissolution of polyurethane resin in an organic solvent and production of an emulsion in water, and Japanese Unexamined Patent Publication (Kokai) No. HEI-3-168217 proposes a process that comprises dissolution of polymethyl methacrylate in methylene chloride and production of an emulsion in water. To produce fine polymer particles from a precursor of a thermosetting polymer, the emulsification-solidification method is known, in which a polymer precursor is emulsified in a dispersion medium and the subjected to a curing reaction (Japanese Unexamined Patent Publication (Kokai) Nos. HEI-1-158042 and HEI-6-287271).

The emulsion method, however, has the feature that the resulting particles have the same diameter as that of the emulsion particles. This emulsion particle diameter depends on the stirring power, viscosity, and interfacial tension, and the particle diameter distribution is large in most cases (Nyuka•Bunsann Purosesu No Kino To Oyogijutsu (published in 1995 by Science Forum Inc.).

Mechanical crushing and chemical particle production have been known as methods to produce particles aromatic polyethersulfone (hereinafter abbreviated as PES particles).

With respect to mechanical crushing, a process that uses a crushing machine to crush aromatic polyethersulfone (hereinafter abbreviated as PES) into particles with a size of several tens μm has been disclosed (JP '727). As particles are crushed to a smaller diameter down to 50 μm or less, however, the time, cost, etc., required for the crushing extremely increase while the productivity decreases. In addition, the particle diameter distribution will become broad and difficult to control.

With respect to chemical particle production, a process that dissolves PES in N-methyl-2-pyrolidone (NMP), adds ethanol to produce a solution, adds it to a solution prepared by dissolving octylphenoxy polyethoxyethanol in pure water to provide an aqueous dispersion liquid containing particles with a diameter of 1 μm or less has been disclosed (JP '081). The document, however, includes no explicit description about the particle diameter distribution, and there is the problem that the process has to use many types of solvents and need difficult steps. There is a document that discloses a process for producing particles by drying in a liquid, but specific techniques are not shown in its examples, making it difficult to infer its practicability (JP '328). In general, the process for drying in a liquid has the problem that it needs difficult steps and a large cost for removal of solvents which leads a decreased productivity.

It could therefore be helpful to provide a simple method, as compared to the conventional methods, to produce fine polymer particles with a uniform particle diameter distribution, and also to provide a method that can easily produce fine particles of various polymers, including those of highly heat resistant polymers that have been difficult to produce with the conventional methods, and fine polymer particles that are produced therewith.

SUMMARY

We thus provide:
(1) A fine polymer particle production method comprising producing an emulsion in a liquid prepared by dissolving and mixing a polymer A and a polymer B in an organic solvent in which a solution phase composed primarily of the polymer A and a solution phase composed primarily of the polymer B are formed as separate phases, and bringing it into contact with a poor solvent for the polymer A to precipitate the polymer A, and
(2) A fine polymer particle production method comprising producing an emulsion in a liquid prepared by dissolving and mixing a polymer A that is at least one selected from the group of vinyl polymer, polycarbonate, polyamide, polyphenylene ether, polyetherimide, amorphous polyarylate, polyamide-imide, and epoxy resin, and a polymer B in an organic solvent in which a solution phase composed primarily of the polymer A and a solution phase composed primarily of the polymer B are formed as separate phases, and bringing it into contact with a poor solvent for the polymer A to precipitate the polymer A.
(3) An aromatic polyethersulfone particle production method comprising precipitating aromatic polyethersulfone particles by bringing a surface active agent having a number average molecular weight of 1,000 or more into contact with an aromatic polyethersulfone having a structure as represented by Formula (a-1) and/or Formula (a-2):

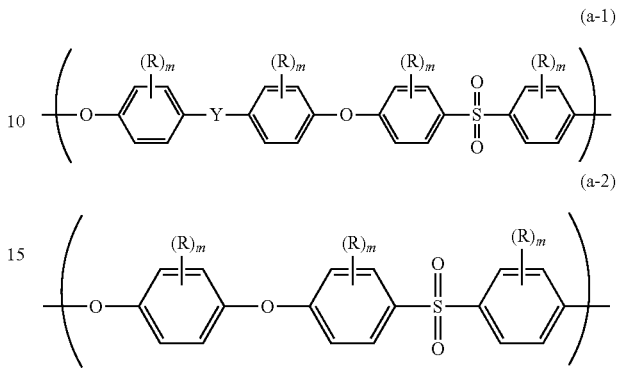

In the formulae, R's, which may be identical to or different from each other, each represent either an alkyl group with a carbon number of 1 to 6 or an aryl group with a carbon number of 6 to 8, and m represents an integer from 0 to 3. Y denotes one selected from the group of a direct bond, oxygen atom, sulfur atom, $SO_2$, CO, $C(CH_3)_2$, $CH(CH_3)$, and $CH_2$.
(4) Fine polymer particles that have a particle diameter distribution index of 2 or less and an average particle diameter of 0.5 μm or more, and that are amorphous.
(5) Fine polymer particles that have a particle diameter distribution index of 2 or less and that are formed of at least one selected from the group of polyethersulfone, polycarbonate, amorphous non-totally aromatic polyamide, polyphenylene ether, polyetherimide, amorphous polyarylate, polyamide-imide, polyether ketone, and epoxy resin.
(6) Fine polymer particles that have a particle diameter distribution index of 2 or less and an average particle diameter of more than 10 μm wherein daughter particles are contained in the fine polymer particles.
(7) Fine polymer particles that have a particle diameter distribution index of 2 or less and an average particle diameter of 20 μm or more wherein the polymer is vinyl polymer.
(8) Aromatic polyethersulfone particles that have a number average particle diameter of 0.1 to 50 μm, and a particle diameter distribution index of 1.0 to 1.5.

The fine polymer particle production method can be applied to various polymers including highly heat resistant polymers to which the conventional methods cannot be applied, and provides a simplified process that can produce fine particles with a narrow particle diameter distribution as compared to the conventional methods which generally require special equipment. Furthermore, the method serves to produce particles that have a narrow particle diameter distribution and small diameters that cannot be achieved with the conventional methods.

DETAILED DESCRIPTION

Figure 1:
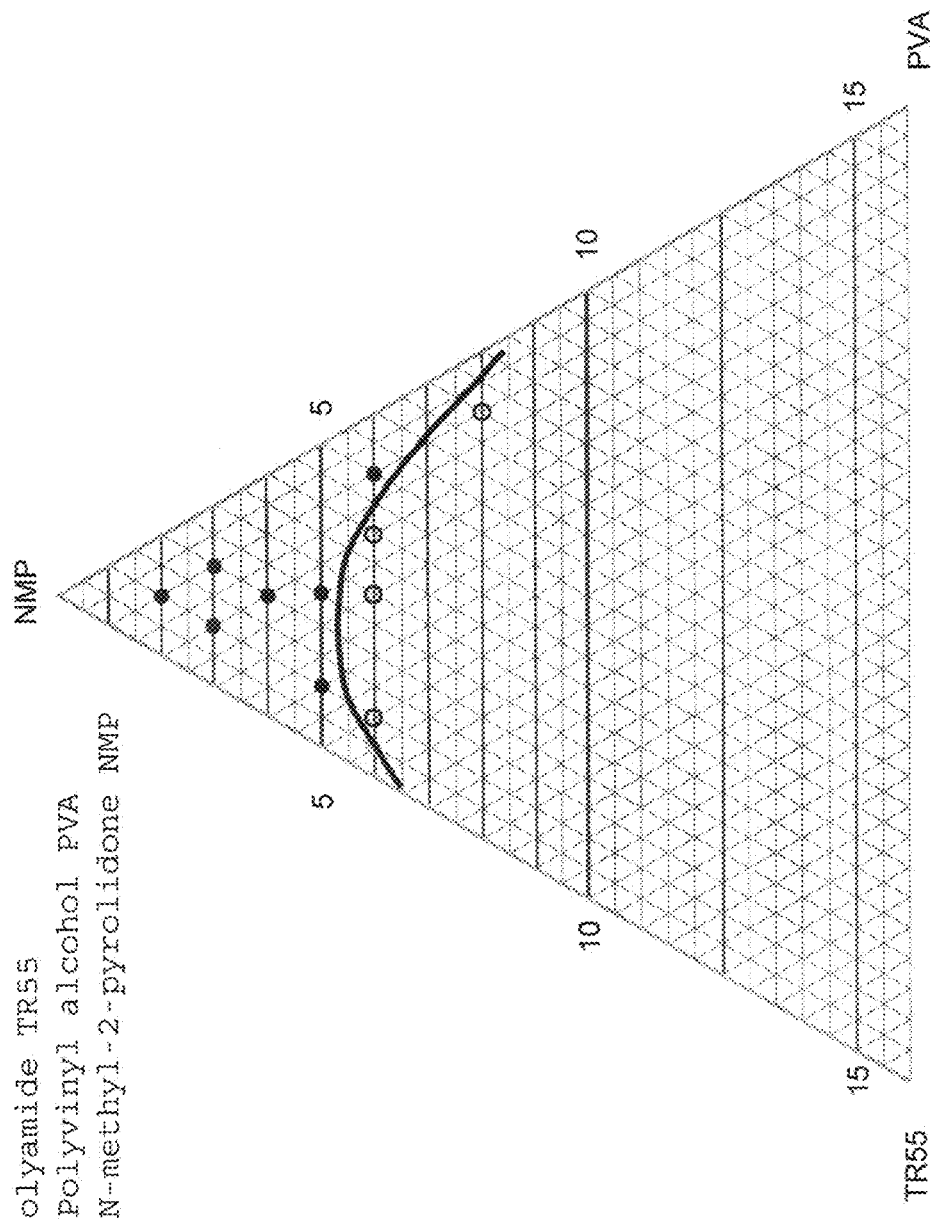
FIG. 1 shows a three-component phase diagram of amorphous polyamide, polyvinyl alcohol, and N-methyl-2-pyrolidone.

This disclosure relates to a fine polymer particle production method comprising producing an emulsion in a liquid prepared by dissolving and mixing a polymer A and a polymer B in an organic solvent in which a solution phase composed primarily of the polymer A (hereinafter, sometimes referred to as polymer A solution phase) and a solution phase composed primarily of the polymer B (hereinafter, sometimes referred to as polymer B solution phase) are formed as separate phases, and bringing it into contact with a poor solvent for the polymer A to precipitate the polymer A.

In the preceding paragraph, "a liquid prepared by dissolving and mixing a polymer A and a polymer B in an organic solvent in which a solution phase composed primarily of the polymer A and a solution phase composed primarily of the polymer B are formed as separate phases" refers to a liquid consisting of two phases, namely, a solution phase composed primarily of the polymer A and a solution phase composed primarily of the polymer B, that is produced by mixing a polymer A, a polymer B, and an organic solvent.

The use of such a liquid consisting of separate phases serves to produce an emulsion by carrying out mixing under conditions to maintain phase separation, followed by emulsification.

The possibility of dissolution of the polymer in the above-mentioned process is checked by determining whether the polymer dissolves in the organic solvent up to more than 1 mass % at the temperature at which the method is carried out, that is, at the temperature at which the polymer A and polymer B are dissolved and mixed to form two separate phases.

For this emulsion, the polymer A solution phase acts as dispersed phase and the polymer B solution phase acts as continuous phase. By bringing this emulsion into contact with a poor solvent for the polymer A, the polymer A is precipitated from the polymer A solution phase in the emulsion to obtain fine polymer particles of the polymer A.

For the production method, there are no specific limitations on the combination of the polymer A, polymer B, organic solvent to dissolve them, and poor solvent for the polymer A, as long as fine polymer particles required can be obtained. The polymer A refers to a high molecular weight polymer, which is preferably a synthetic polymer that does not naturally exist, more preferably a non-water-soluble polymer, and may be, for instance, a thermoplastic or thermosetting resin.

Specifically, the useful thermoplastic resins include vinyl polymer, polyester, polyamide, polyarylene ether, polyarylene sulfide, polyethersulfone, polysulfone, polyether ketone, polyether ether ketone, polyurethane, polycarbonate, polyamide-imide, polyimide, polyetherimide, polyacetal, silicone, and copolymers thereof.

A vinyl polymer is produced by carrying out homopolymerization or copolymerization of vinyl monomers. The vinyl polymer may be a rubber-containing graft copolymer produced by graft copolymerization of vinyl monomers (such as styrene, other aromatic vinyl monomers, vinyl cyanide monomers, and other vinyl monomers) or their mixture under the existence of a rubbery polymer, or a vinyl polymer containing a rubbery polymer such as a composition of the former and a vinyl polymer.

Specifically, such vinyl polymers include polyethylene, polypropylene, polystyrene, poly(acrylonitrile-styrene-butadiene) resin (ABS), polytetrafluoroethylene (PTFE), polyacrylonitrile, polyacrylic amide, polyvinyl acetate, polybutyl acrylate, polymethyl methacrylate, and cyclic polyolefin.

By applying the method to a vinyl polymer, it will be possible to produce particles with a narrow particle diameter distribution in a size range, such as an average particle diameter of 10 µm or more, preferably 20 µm or more, where it has been difficult to produce particles with a narrow particle diameter distribution. The upper limit for this is commonly 1,000 µm.

In particular, applying the method to the vinyl polymer is very preferable because fine polymer particles of a daughter particle dispersed structure that cannot be produced by the conventional methods, that is, a structure in which a graft copolymer (daughter particles) is dispersed in a vinyl polymer matrix, can be produced with a narrow particle diameter distribution. Specifically, an example is a poly(acrylonitrile-styrene-butadiene) resin (ABS resin) consisting of a rubber containing graft copolymer dispersed in a poly(acrylonitrile-styrene) resin matrix.

The polyester may be a polymer composed, as structural units, of a multivalent carboxylic acid or its ester-forming derivative and a polyhydric alcohol or its ester-forming derivative, a polymer composed, as a structural unit, of a hydroxycarboxylic acid or lactone, or a copolymer thereof.

Specifically, the useful polyesters include polyethylene terephthalate, polypropylene terephthalate, polybutylene terephthalate, poly cyclohexane dimethylene terephthalate, poly hexylene terephthalate, polyethylene naphthalate, polypropylene naphthalate, polybutylene naphthalate, polyethylene isophthalate/terephthalate, polypropylene isophthalate/terephthalate, polybutylene isophthalate/terephthalate, polyethylene terephthalate/naphthalate, polypropylene terephthalate/naphthalate, polybutylene terephthalate/naphthalate, polybutylene terephthalate/decane dicarboxylate, polyethylene terephthalate/cyclohexane dimethylene terephthalate, polyethylene terephthalate/polyethylene glycol, polypropylene terephthalate/polyethylene glycol, polybutylene terephthalate/polyethylene glycol, polyethylene terephthalate/polytetramethylene glycol, polypropylene terephthalate/polytetramethylene glycol, polybutylene terephthalate/polytetramethylene glycol, polyethylene terephthalate/isophthalate/polytetramethylene glycol, polypropylene terephthalate/isophthalate/polytetramethylene glycol, polybutylene terephthalate/iso-phthalate/polytetramethylene glycol, polyethylene terephthalate/succinate, polypropylene terephthalate/succinate, polybutylene terephthalate/succinate, polyethylene terephthalate/adipate, polypropylene terephthalate/adipate, polybutylene terephthalate/adipate, polyethylene tereph-thalate/sebacate, polypropylene terephthalate/sebacate, polybutylene terephthalate/sebacate, polyethylene terephthalate/isophthalate/adipate, polypropylene terephthalate/isophthalate/adipate, polybutylene terephthalate/isophthalate/succinate, polybutylene terephthalate/isophthalate/adipate, polybutylene terephthalate/isophthalate/sebacate, bisphenol A/terephthalic acid, bisphenol A/isophthalic acid, and bisphenol A/terephthalic acid/isophthalic acid.

If an amorphous polyarylate is used as the polyester, in particular, its high solubility in many organic solvents permits easy selection of an appropriate organic solvent and fine particles with a high heat resistance can be produced. The preferable amorphous polyarylates for this include bisphenol A/terephthalic acid, bisphenol A/isophthalic acid, and bisphenol A/terephthalic acid/isophthalic acid.

The polyamide may be one produced through condensation polymerization of a lactam with a three- or more membered ring, polymerizable aminocarboxylic acid, dibasic acid and diamine or a salt thereof.

The useful polyamides include polycaproamide (nylon 6), polyhexamethylene adipamide (nylon 66), polypentamethylene adipamide (nylon 56), polyhexamethylene sebacamide (nylon 610), polyundeca amide (nylon 11), polydodeca amide (nylon 12), and polyhexamethylene terephthalamide (nylon 6T), and the amorphous polyamides include a copolymer of 3,3'-dimethyl-4,4'-diaminodicyclohexyl methane, isophthalic acid, and 12-aminododecanoic acid (such as Grilamide (registered trademark) TR55, supplied by EMS Werke, Inc.), a copolymer of 3,3'-dimethyl-4,4'-diaminodicyclohexyl methane and dodeca diacid (such as Grilamide (registered trademark) TR90, supplied by EMS Werke, Inc.), a mixture of a copolymer of 3,3'-dimethyl-4,4'-diaminodicyclohexyl methane, isophthalic acid, and 12-amino dodecanoic acid and a copolymer of 3,3'-dimethyl-4,4'-diaminodicyclohexyl methane and 1,10-decanedicarboxylic acid (such as Grilamide (registered trademark) TR70LX, supplied by EMS Werke, Inc.), and a copolymer of 4,4'-diaminodicyclohexyl methane and 1,10-decanedicarboxylic acid (such as Trogamid (registered trademark) CX7323, supplied by Degussa AG).

Of these, amorphous polyamides are particularly preferable in view of their easy dissolution in solvents. In particular, non-totally aromatic polyamides are preferable, and specifically, aliphatic polyamides, semiaromatic polyamides, and alicyclic polyamide may be used. Applying of the method to these polyamides is very effective because it is possible to produce fine polymer particles with a narrow particle diameter distribution that are difficult to produce by the conventional methods.

A polyarylene ether is a polymer comprising aryl groups connected through ether bonds, and may have a structure as represented by Formula (1):

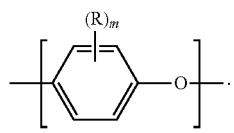

(1)

The aromatic ring in them may or may not contain a substituent group R, and the number of the substituent groups, m, is 1 to 4. The preferable substituent groups include saturated hydrocarbon groups with a carbon number of 1 to 6 such as methyl group, ethyl group, and propyl group; unsaturated hydrocarbon groups such as vinyl group and allyl group; halogen groups such as fluorine atom, chlorine atom, and bromine atom; and others such as amino group, hydroxyl group, thiol group, carboxyl group, and carboxy aliphatic hydrocarbon ester group.

Specifically, the polyarylene ether may be poly(2,6-dimethyl phenylene ether).

A polyarylene sulfide is a polymer comprising aryl groups connected through sulfide bonds and may have a structure as represented by Formula (2):

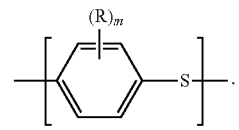

(2)

The aromatic ring in them may or may not contain a substituent group R, and the number of the substituent groups, m, is 1 to 4. The useful substituent groups include saturated hydrocarbon groups such as methyl group, ethyl group, and propyl group; unsaturated hydrocarbon groups such as vinyl group and allyl group; halogen groups such as fluorine atom, chlorine atom, and bromine atom; and others such as amino group, hydroxyl group, thiol group, carboxyl group, and carboxy aliphatic hydrocarbon ester group. It is also possible that a methaphenilene unit, an ortho phenylene unit, and a copolymer thereof may be used instead of the paraphenylene sulfide unit in Formula (2).

Specifically, the polyarylene sulfide may be a polyphenylene sulfide.

A polyether sulfone has a structure represented by Formula (a-1) and/or Formula (a-2):

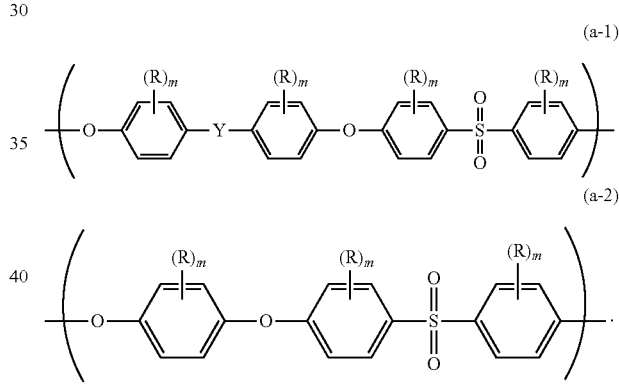

In the formulae, R's may be identical to or different from each other and each represent an alkyl group with a carbon number of 1 to 6 or an aryl group with a carbon number of 6 to 8, m represents an integer from 0 to 3. Y shows any of the following: direct bond, oxygen, sulfur, $SO_2$, CO, $C(CH_3)_2$, $CH(CH_3)$, and $CH_2$.

The molecular end of a polyethersulfone is preferably a PES with a hydroxyphenyl end-group content (mol %) is less than 50. The hydroxyphenyl end-group content as referred to above is calculated by the equation given below from the ratio of the area for the proton ($1H_{Cl}$) adjacent to the aromatic carbons substituted by chloro groups at 7.7 ppm and the area for the proton ($1H_{OH}$) adjacent to the aromatic carbons substituted by hydroxyl groups at 6.6 to 6.9 ppm, determined by taking 100 scans of $^1$H-NMR at 400 MHz in a deuterated DMSO solvent:

[Hydroxy phenyl end-group content (mol %)]=[Peak area of $^1H_{OH}$]/([Peak area of $^1H_{OH}$]+[Peak area of $^1H_{Cl}$])×100

[Chlorophenyl end-group content (mol %)]=[Peak area of $^1H_{Cl}$]/([Peak area of $^1H_{OH}$]+[Peak area of $^1H_{Cl}$])×100.

The hydroxy phenyl end-group content (mol %) is more preferably less than 40 mol %, still more preferably less than 30 mol %.

The molecular weight of the polyethersulfone is preferably such that the polyethersulfone has a reduced viscosity in the range of 0.10 to 1.00 as measured in DMF (N,N-dimethyl formamide) under the conditions of 25° C. and 1 g/dl using an Ostwald capillary viscometer (according to the procedure as described in JIS K 7367-1 (2002)).

Such a polyethersulfone can be commonly produced with a generally known method. The products of polyethersulfone produced with a generally known method include, for instance, the Ultrason E series, supplied by BASF, and the Sumikaexcel series supplied by Sumitomo Chemical Co., Ltd.

The polysulfone is preferably one having a structure as represented by Formula (3):

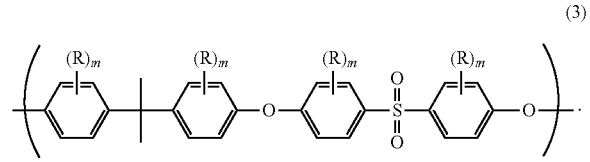

R's in the formula represent an alkyl group with a carbon number of 1 to 6 or an aryl group with a carbon number of 6 to 8, and m denotes an integer of 0 to 4.

The polycarbonate is a polymer comprising a carbonate group and preferably has a structure as represented by Formula (6):

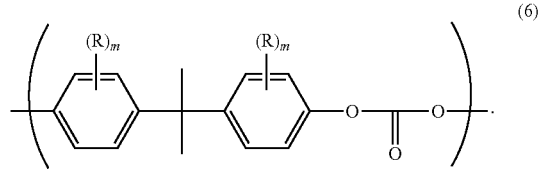

R's in the formula represent an alkyl group with a carbon number of 1 to 6 or an aryl group with a carbon number of 6 to 8, and m denotes an integer of 0 to 4.

Specifically, it may be a polymer free of Rm substituent groups that is produced from bisphenol A through condensation of carbonate bonds. It may be produced through copolymerization of a polycarbonate and the polyester.

The polyamide-imide is a polymer comprising an imide bond and an amide bond and may have a structure as represented by Formula (7):

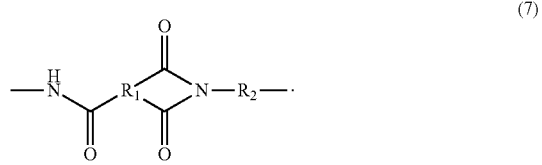

In the formula, $R_1$ and $R_2$ represent an aromatic or aliphatic hydrocarbon. The molecule may contain a group structure comprising ether bond, thioether bond, carboxyl group, halogen bond, and amide bond.

The polyimide is a polymer comprising an imide bond and typically has a structure as represented by Formula (8):

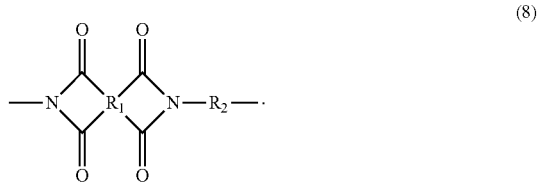

In the formula, $R_1$ and $R_2$ represent an aromatic or aliphatic hydrocarbon. The molecule may contain a group structure comprising ether bond, thioether bond, carboxyl group, halogen bond, and amide bond.

For this case, in particular, it is preferably a thermoplasticity polyimide and specifically, it may be a condensation polymer of 1,2,4,5-benzene tetracarboxylic anhydride and 4,4'-bis(3-aminophenyl)oxy biphenyl or a condensation polymer of 3,3',4,4'-biphenyl tetracarboxylic anhydride and 1,3-bis(4-aminophenyl)oxy benzene.

The polyetherimide is a polymer comprising an ether bond and imide bond in the molecule, and specifically, it may be a polymer produced by condensation of 4,4'-[isopropylidene bis(p-phenyleneoxy)]diphthalic dianhydride and methaphenylene diamine.

The polymer A may be a thermosetting resin, and specifically, the useful ones include epoxy resin, benzoxazine resin, vinyl ester resin, unsaturated polyester resin, urethane resin, phenol resin, melamine resin, maleimide resin, cyanate resin, and urea resin.

Of these, the epoxy resin is used preferably because of its high heat resistance and adhesiveness. The useful epoxy resins include, for instance, glycidyl ether type epoxy resins produced from a compound comprising a hydroxyl group in the molecule and epichlorohydrin, glycidyl amine type epoxy resins produced from a compound comprising an amino group in the molecule and epichlorohydrin, glycidyl ester type epoxy resins produced from a compound comprising a carboxyl group in the molecule and epichlorohydrin, alicyclic epoxy resins produced by oxidizing a compound comprising a double bond in the molecule, and epoxy resins comprising two or more of these different groups coexisting in the molecule.

A curing agent may be used in combination with these epoxy resins. The curing agents that can be used in combination with an epoxy resin include, for instance, aromatic amine, aliphatic amine, polyamide amine, carboxylic anhydride, Lewis acid complex, acidic curing catalyst, and basic curing catalyst.

The preferable resins to be used as the polymer A include polystyrene, poly(acryl-onitrile-styrene-butadiene) (ABS) resin, polyacrylonitrile, polymethylamide, other vinyl polymers, polyethersulfone, polycarbonate, polyamide, polyphenylene ether, polyetherimide, amorphous polyarylate, polyamide-imide, polyether ketone, polyether ether ketone, and epoxy resin, of which highly preferable are polyethersulfone, polycarbonate, amorphous non-totally aromatic polyamide, polyphenylene ether, polyetherimide, amorphous polyarylate, polyamide-imide, polyether ketone, and epoxy resin. Of these, particularly preferable are polyethersulfone, polycarbonate, amorphous non-totally aromatic polyamide resin, polyphenylene ether, polyetherimide, and epoxy resin.

The above-mentioned resins for the polymer A may be used singly or in combination.

These preferable resins have good thermal and/or mechanical properties, and they can form fine particles with a narrow particle diameter distribution and a particle diameter distribution index of, for instance, 3 or less, or even 2 or less. They are preferable in that their fine particles can be used in fields where the conventional ones cannot work effectively.

With respect to the molecular weight, the polymer A preferably has a weight average molecular weight of 1,000 to 100,000,000, more preferably 1,000 to 10,000,000, and still more preferably 5,000 to 1,000,000. It is particularly preferably in the range of 10,000 to 500,000, and most preferably in the range of 10,000 to 100,000.

The weight average molecular weight as referred to here is the weight average molecular weight value measured by gel permeation chromatography (GPC) in dimethyl formamide used as solvent and converted in terms of polystyrene.

Tetrahydrofuran is used if dimethyl formamide does not serve for the measurement, and hexafluoroisopropanol is used if measurement is still impossible. If it is still impossible to make measurements with hexafluoroisopropanol, 2-chloronaphthalene is used for the measurement.

The polymer A is preferably a polymer that does not dissolve in the poor solvent used because the most important step is the precipitation of fine particles achieved by bringing it into contact with the poor solvent. It is preferable that the polymer does not dissolve in the poor solvents listed later, and it is more preferable that the polymer is not soluble in water.

The non-water-soluble polymer should have a water solubility of 1 mass % or less, preferably 0.5 mass % or less, and more preferably 0.1 mass % or less.

In addition, the polymer A is preferably an amorphous polymer in view of the solubility in organic solvents. Of the above-mentioned example polymers of the polymer A, accordingly, the amorphous ones are used preferably.

The amorphous polymer is a polymer that is free of crystalline portions or a polymer that consists of a crystalline phase and an amorphous phase, with the crystalline phase accounting for a smaller proportion. Differential scanning calorimetry (DSC) is useful for the determination. Specifically, it is preferable that the heat of fusion is unobservable in DSC of the polymer or the heat of fusion should be 10 J/g or less, preferably 5 J/g or less, more preferably 2 J/g or less, and still more preferably 1 J/g or less. In this DSC measurement, the polymer is first heated from 30° C. up to a temperature higher by 30° C. than the melting point of the polymer at a heating rate of 20° C./min, held there for 1 minute, cooled to 0° C. at 20° C./min, held there for 1 minute, and heated again at 20° C./min to determine the heat of fusion. If a heat of crystallization is observed during the second heating step, the measured heat of crystallization is subtracted from the measured heat of fusion to determine the value of the heat of fusion to be used here.

The polymer B may be a thermoplastic resin or a thermosetting resin, and it is preferably soluble in the organic solvent to dissolve the polymer A and also soluble in the poor solvent for the polymer A. It is more preferably soluble in the organic solvent and also soluble in alcohol solvent or water in terms of industrial handleability, and still more preferably soluble in the organic solvent and also soluble in methanol, ethanol, or water.

Specific examples of the polymer B include synthetic resins such as polyvinyl alcohol (which may be a fully saponified or a partially saponified polyvinyl alcohol), polyvinyl alcohol-ethylene copolymer (which may be a fully saponified or a partially saponified polyvinyl alcohol-ethylene copolymer), polyvinyl pyrolidone, polyethylene glycol, sucrose fatty acid ester, polyoxyethylene fatty acid ester, polyoxyethylene lauric fatty acid ester, polyoxyethylene glycol monofatty acid ester, polyoxyethylene alkyl phenyl ether, polyoxyalkyl ether, polyacrylic acid, sodium polyacrylate, polymethacrylic acid, sodium polymethacrylate, polystyrene sulfonic acid, sodium polystyrene sulfonate, polyvinyl pyrolidinium chloride, poly(styrene-maleic acid) copolymer, amino polyacrylamide, poly (para-vinyl phenol), polyallyl amine, polyvinyl ether, polyvinyl formal, polyacrylamide, polymethacrylamide, polyoxyethylene amine, polyvinyl pyrolidone, polyvinyl pyridine, polyaminosulfone, and polyethylene imine; disaccharides such as maltose, cellobiose, lactose, and sucrose; and cellulose derivatives such as cellulose, chitosan, hydroxyethyl cellulose, hydroxypropyl cellulose, methyl cellulose, ethyl cellulose, ethylhydroxy cellulose, carboxymethylethyl cellulose, carboxymethyl cellulose, carboxymethyl cellulose sodium, and cellulose ester; and polysaccharides and derivatives thereof such as amylase and derivatives thereof, starch and derivatives thereof, dextrin, cyclodextrin, and odium alginate and derivatives; and others such as gelatin, casein, collagen, albumin, fibroin, keratin, fibrin, carrageenan, chondroitin sulfate, gum arabic, agar, and protein. The preferable ones include polyvinyl alcohol (which may be a fully saponified or a partially saponified polyvinyl alcohol), polyvinyl alcohol-ethylene copolymer (which may be a fully saponified or a partially saponified polyvinyl alcohol-ethylene copolymer), polyethylene glycol, sucrose fatty acid ester, polyoxyethylene alkyl phenyl ether, polyoxyalkyl ether, polyacrylic acid, polymethacrylic acid, carboxymethyl cellulose, hydroxyethyl cellulose, hydroxypropyl cellulose, methyl cellulose, ethyl cellulose, ethylhydroxy cellulose, carboxymethylethyl cellulose, carboxymethyl cellulose, carboxymethyl cellulose sodium, cellulose ester, other cellulose derivatives, and polyvinyl pyrolidones. The more preferable ones include polyvinyl alcohol (which may be a fully saponified or a partially saponified polyvinyl alcohol), polyvinyl alcohol-ethylene copolymer (which may be a fully saponified or a partially saponified polyvinyl alcohol-ethylene copolymer), polyethylene glycol, carboxymethyl cellulose, hydroxyethyl cellulose, hydroxypropyl cellulose, methyl cellulose, ethyl cellulose, ethylhydroxy cellulose, carboxymethyl ethyl cellulose, carboxymethyl cellulose, carboxymethyl cellulosesodium, cellulose ester, other cellulose derivatives, and polyvinyl pyrolidones. Furthermore, still more preferable ones include polyvinyl alcohol (which may be a fully saponified or a partially saponified polyvinyl alcohol), polyethylene glycol, carboxymethyl cellulose, hydroxyethyl cellulose, hydroxypropyl cellulose, methyl cellulose, ethyl cellulose, ethylhydroxy cellulose, other cellulose derivatives, and polyvinyl pyrolidone.

With respect to the molecular weight, the polymer B preferably has a weight average molecular weight of 1,000 to 100,000,000, more preferably 1,000 to 10,000,000, and still more preferably 5,000 to 1,000,000. It is particularly preferably in the range of 10,000 to 500,000, and most preferably in the range of 10,000 to 100,000.

The weight average molecular weight as referred to here is the weight average molecular weight value measured by gel permeation chromatography (GPC) in water used as solvent and converted in terms of polyethylene glycol.

Dimethyl formamide is used if water does not serve for the measurement, and tetrahydrofuran is used if measurement is still impossible. If it is still impossible to make measurements, then hexafluoroisopropanol is used.

The organic solvents that dissolve the polymer A and the polymer B are those organic solvents that can dissolve the polymer A and the polymer B to be used, and appropriate ones are selected to meet the properties of each polymer.

Specific examples include aliphatic hydrocarbon solvents such as pentane, hexane, heptane, octane, nonane, n-decane, n-dodecane, n-tridecane, tetradecane, cyclohexane, and cyclopentane; aromatic hydrocarbon solvents such as benzene, toluene, xylene, and 2-methyl naphthalene; ester solvents such as ethyl acetate, methyl acetate, butyl acetate, butyl propionate, and butyl butyrate; halogenated hydrocarbon solvents such as chloroform, bromoform, methylene chloride, carbon tetrachloride, 1,2-dichloroethane, 1,1,1-trichloroethane, chlorobenzene, 2,6-dichlorotoluene, and hexafluoroisopropanol; ketone solvents such as acetone, methyl ethyl ketone, methyl isobutyl ketone, and methyl butyl ketone; alcohol solvents such as methanol, ethanol, 1-propanol, and 2-propanol; aprotic polar solvents such as N-methyl-2-pyrolidone (NMP), dimethyl sulfoxide (DMSO), N,N-dimethyl formamide (DMF), N,N-dimethyl acetamide (DMA), propylene carbonate, trimethyl phosphate, 1,3-dimethyl-2-imidazolidinone, and sulfolane; carboxylic acid solvents such as formic acid, acetic acid, propionic acid, butyric acid, and lactic acid; ether solvents such as anisole, diethyl ether, tetrahydrofuran, diisopropyl ether, dioxane, diglyme, and dimethoxy ethane; ionic liquids such as 1-butyl-3-methyl-imidazolium acetate, 1-butyl-3-methyl-imidazolium hydrogen sulfate, 1-ethyl-3-imidazolium acetate, and 1-ethyl-3-methyl-imidazolium thiocyanate; and mixtures thereof. The preferable ones include aromatic hydrocarbon solvents, aliphatic hydrocarbon solvents, halogenated hydrocarbon solvents, alcohol solvents, ether solvents, aprotic polar solvents, and carboxylic acid solvents, and the more preferable ones include alcohol solvents, aprotic polar solvents, and carboxylic acid solvents that are water-soluble. The very preferable ones include aprotic polar solvents and carboxylic acid solvents. The most preferable ones include N-methyl-2-pyrolidone, dimethyl sulfoxide, N,N-dimethyl formamide, N,N-dimethyl acetamide, propylene carbonate, formic acid, and acetic acid, because they are widely available, able to dissolve a wide range of polymers that can be used as the polymer A, and able to mix uniformly with the undermentioned poor solvents such as water and alcohol solvents.

Two or more these organic solvent may be used separately or as a mixture, but the use of a single organic solvent is preferable because they can serve to produce particles with a relatively small particle diameter and with a narrow particle diameter distribution, avoid separation operations for recycling of used solvents, and decrease the process load for production. It is more preferable to use a single organic solvent that dissolves both the polymer A and the polymer B.

The poor solvent for the polymer A is a solvent that does not dissolve the polymer A. The expression "does not dissolve a solvent" here means that the solubility of the polymer A in the poor solvent is 1 mass % or less, preferably 0.5 mass % or less, and more preferably 0.1 mass % or less.

The production method uses a poor solvent for the polymer A, and it is preferable that the poor solvent is a poor solvent for the polymer A that can dissolve the polymer B. This serves to efficiently precipitate fine polymer particles formed of the polymer A. It is preferable, furthermore, that the solvent used to dissolve both the polymer A and the polymer B can mix uniformly with the poor solvent for the polymer A.

Selection of a poor solvent depends largely on the type of the polymer A used and desirably on the type of both the polymers A and B. To give some specific examples, it may be at least one solvent selected from the group of aliphatic hydrocarbon solvents such as pentane, hexane, heptane, octane, nonane, n-decane, n-dodecane, n-tridecane, tetradecane, cyclohexane, and cyclopentane; aromatic hydrocarbon solvents such as benzene, toluene, xylene, and 2-methyl naphthalene; ester solvents such as ethyl acetate, methyl acetate, butyl acetate, butyl propionate, and butyl butyrate; halogenated hydrocarbon solvents such as chloroform, bromoform, methylene chloride, carbon tetrachloride, 1,2-dichloroethane, 1,1,1-trichloroethane, chlorobenzene, 2,6-dichlorotoluene, and hexafluoroisopropanol; ketone solvents such as acetone, methyl ethyl ketone, methyl isobutyl ketone, and methyl butyl ketone; alcohol solvents such as methanol, ethanol, 1-propanol, and 2-propanol; aprotic polar solvents such as dimethyl sulfoxide, N,N-dimethyl formamide, N,N-dimethyl acetamide, trimethyl phosphate, N-methyl-2-pyrolidone, 1,3-dimethyl-2-imidazolidinone, and sulfolane; carboxylic acid solvents such as formic acid, acetic acid, propionic acid, butyric acid, and lactic acid; ether solvents such as anisole, diethyl ether, tetrahydrofuran, diisopropyl ether, dioxane, diglyme, and dimethoxy ethane; and water.

For efficient production of particles of the polymer A, the preferable ones include aromatic hydrocarbon solvents, aliphatic hydrocarbon solvents, alcohol solvents, ether solvents, and water, of which the most preferable are alcohol solvents and water, and particularly preferable is water.

Substances for the polymer A and the polymer B, organic solvents to dissolve them, and a poor solvent for the polymer A should be appropriately selected and combined to precipitate the polymer A efficiently to form fine polymer particles. The mixed liquid consisting of the polymers A and B and an organic solvent that dissolve them should be constituted of two separate phases, namely, a solution phase composed primarily of the polymer A and a solution phase composed primarily of the polymer B.

In this step, the organic solvent for the solution phase composed primarily of the polymer A and the organic solvent containing primarily the polymer B may be identical with or different from each other, but it is preferable that these solvents are virtually identical.

The conditions for formation of the two separate phase state depend on the type of the polymers A and B and the molecular weight of the polymers A and B, the type of the organic solvent, and the concentration of the polymers A and B, and the temperature and pressure at which the method is to be carried out.

To develop conditions where phase separation easily takes place, it is preferable that the solubility parameter (hereinafter, sometimes referred to as SP value) of the polymer A and that of the polymer B are largely different from each other.

The difference in the SP value is preferably 1 $(J/cm^3)^{1/2}$ or more, more preferably 2 $(J/cm^3)^{1/2}$ or more, and still more preferably 3 $(J/cm^3)^{1/2}$ or more. It is particularly preferably 5 $(J/cm^3)^{1/2}$ or more, most preferably 8 $(J/cm^3)^{1/2}$ or more. The phase separation can easily take place if the SP value is in this range.

There are no specific limitations on the maximum difference in the SP value as long as both the polymer A and the polymer B can dissolve in the organic solvent, but it is preferable that the maximum difference is 20 $(J/cm^3)^{1/2}$ or less, more preferably 15 $(J/cm^3)^{112}$ or less, and still more preferably 10 $(J/cm^3)^{1/2}$ or less.

The SP value referred to here should be calculated according to Fedor's estimation method based on the coagulation energy density and the molecular volume (hereinafter, sometimes referred as calculation-based method) (SP-Chi Kiso•Oyo To Keisan Hoho, Hideki Yamamoto, pub. Johokiko Co., Ltd., Mar. 31, 2005).

If calculation cannot be performed by this method, the SP value is calculated from measurements based on whether it is dissolved in a solvent with a known solubility parameter (hereinafter, sometimes referred as measurement-based method), and the calculated value is used instead (Polymer Handbook Fourth Edition, J. Brand, pub. Wiley, 1998).

For vinyl polymers including rubbery polymers, the SP value of the matrix resin is determined with the technique and used for the method.

Appropriate conditions for phase separation can be determined based on a three-component phase diagram developed from a simple preliminary test to observe the changes in the state with the ratio among the three components of the polymer A, the polymer B and the organic solvent to dissolve them.

To prepare a phase diagram, the polymers A and B and the solvent are mixed and dissolved at an appropriate ratio, and left to stand to see whether an interface is formed. This test is carried out at least at three or more ratios, preferably at five or more ratios, more preferably at 10 or more ratios. The range where two phase separation takes place and the range where only one phase forms are determined, which will allow the conditions for desired phase separation to be estimated.

To check whether a phase-separated state can form in this test, the polymers A and B are mixed so that the polymers A and B and the solvent is at an appropriate ratio at the temperature and pressure where the method is to be carried out, and then the polymers A and B are dissolved completely. After the dissolution, the solution is stirred adequately, left to stand for three days, and observed to see whether phase separation occurs macroscopically.

In some cases where a sufficiently stable emulsion forms, however, macroscopic phase separation will not occur after being left to stand for three days. In such cases, the occurrence of phase separation is determined based on microscopic phase separation observation with an optical microscope or phase contrast microscope.

FIG. 1 shows a three-component phase diagram where the polymer A is a copolymer of 3,3'-dimethyl-4,4'-diaminodicyclohexyl methane, isophthalic acid, and 12-amino dodecanoic acid (Grilamide (registered trademark) TR55), which is an amorphous polyamide, the polymer B being polyvinyl alcohol, and the organic solvent being N-methyl-2-pyrolidone. Black dots indicate points where phase separation does not take place, while the white dots indicate points where phase separation occurs. From these black and white dots, the range where only one phase forms and the range where the liquid is separated into two phases can be estimated easily. The method is carried out at a ratio of components in the range where separation into two phases is likely to take place based on this three-component diagram.

This phase separation takes place as a result of separation between the polymer A solution phase, which is composed primarily of the polymer A, and the polymer B solution phase, which is composed primarily of the polymer B, in the organic solvent. In this step, the polymer A is mainly distributed into the polymer A solution phase while the polymer B is mainly distributed into the polymer B solution phase. The polymer A solution phase and the polymer B solution phase seem to have a volume ratio that depends on the type and amount of the polymers A and B.

The concentration of the polymers A and B in the organic solvent is preferably more than 1 mass % and 50 mass % or less, more preferably more than 1 mass % and 30 mass % or less, and more preferably more than 2 mass % and 20 mass % or less, on the assumption that phase separation can actually take place and that the polymers can actually dissolve in the organic solvent at concentrations in an industrially feasible concentration range.

The interface tension between the two phases, i.e., the polymer A solution phase and the polymer B solution phase, is small because both phases are formed of an organic solvent, and this feature allows the resulting emulsion to be maintained stably, which seems to be a major factor in the formation of particles with a narrow diameter distribution. In particular, this effect is noticeable when the same organic solvent is used for the polymer A phase and the polymer B phase.

The interface tension between the two phases is too small to measure directly with the commonly-used hanging-drop method in which a solution added to another solution to take measurements. The interface tension, however, can be estimated from the surface tension of each phase exposed to air. Thus, assuming $r_1$ and $r_2$ represent the surface tension of each phase exposed to air, the interface tension $r_{12}$ is estimated to be the absolute value of the difference between them as follows: $r_{12}=r_1-r_2$. The value of $r_{12}$ is preferably more than 0 mN/m and 10 mN/m or less, more preferably more than 0 mN/m and 5 mN/m or less, still more preferably more than 0 mN/m and 3 mN/m or less, and still more preferably more than 0 mN/m and 2 mN/m or less.

The viscosity ratio between the two phases influences the average particle diameter and the particle diameter distribution. The particle diameter distribution tends to decrease with a decreasing viscosity ratio. The ratio of the viscosity of the polymer A solution phase to that of the polymer B solution under thermal conditions for implementing the method is preferably 0.1 or more and 10 or less, more preferably 0.2 or more and 5 or less, still more preferably 0.3 or more and 3 or less, particularly preferably 0.5 or more and 1.5 or less, and extremely preferably 0.8 or more and 1.2 or less.

Fine polymer particles are then produced by use of the resulting liquid that causes phase separation. Production of fine particles is carried out in a common reaction vessel. In view of industrial feasibility, the temperature range for carrying out the method is −50° C. to 200° C., preferably −20° C. to 150° C., more preferably 0° C. to 120° C., still more preferably 10° C. to 100° C., particularly preferably 20° C. to 80° C., and most preferably 20° C. to 50° C. In view of industrial feasibility, the pressure range for carrying out the method is reduced pressure to 100 atm, preferably 1 atm to 5 atm, more preferably, 1 atm to 2 atm, and particularly preferably atmospheric pressure.

An emulsion is then produced by mix the phase separated liquid under these conditions.

Specifically, a shear force is applied to the resulting phase separated solution to produce an emulsion.

In the emulsion production step, an emulsion is formed as particle-like droplets are produced from the polymer A solution phase. Commonly, in a phase separated liquid, such a form of emulsion tends to be easily produced when the volume of the polymer B solution phase is larger than that of the polymer A solution phase. In particular, the volume of the polymer A solution phase preferably accounts for 0.4 or less, more preferably 0.4 to 0.1, of the total volume of the two phases. An appropriate range can be assumed easily if the volume ratio at different concentrations of each component is measured beforehand when preparing the phase diagram.

The fine particles produced with the present production method has a narrow particle diameter distribution. This is the result of the formation of a very uniform emulsion in the emulsion production step. This tendency is noticeable in cases where a single solvent is used to dissolve both the polymers A and B. Therefore, a generally known method can serve sufficiently to achieve a sufficient shear force for the formation of an emulsion. Such generally known methods include liquid phase stirring using stirring blades, stirring in a continuous biaxially mixer, mixing in a homogenizer, and ultrasonic irradiation.

When stirring blades are used to perform the stirring step, in particular, the stirring speed is preferably 50 rpm to 1,200 rpm, more preferably 100 rpm to 1,000 rpm, still more preferably 200 rpm to 800 rpm, and particularly preferably 300 to 600 rpm, depending on the shape of the stirring blades.

Specifically, the stirring blades may have such shapes as propeller, paddle, flat paddle, turbine, double cone, single cone, single ribbon, double ribbon, screw, and helical ribbon. The tools are not limited to these, and others can be used if a sufficient shear force can be applied. Baffle boards or the like may be provided in the vessel to perform efficient stirring.

In addition to stirrers, widely known tools such as emulsifying machine and dispersion machine may be used for the production of an emulsion. Specific examples include batch-type emulsifying machines such as Homogenizer (supplied by IKA), Polytron (supplied by Kinematica, Inc.), and T. K. Autohomomixer (supplied by Tokushu Kika Kogyo Co., Ltd.), and others such as Ebara Milder (supplied by Ebara Corporation), T. K. Filmics, T. K. Pipeline Homomixer (supplied by Tokushu Kika Kogyo Co., Ltd.), Colloid Mill (supplied by Shinko-Pantec Co., Ltd.), and Slusher, Trigonal Wet Grinder (Mitsui Miike Kakoki Co., Ltd.), as well as ultrasonic homogenizers and static mixers.

The emulsion thus obtained is subsequently subjected to a step designed to precipitate fine particles.

To obtain fine particles of the polymer A, a poor solvent for the polymer A is brought into contact with the emulsion produced step to precipitate fine particles having a diameter corresponding to that of the emulsion.

The contact between the poor solvent and the emulsion may be achieved by either pouring the emulsion in the poor solvent, or pouring the poor solvent in the emulsion, but it is preferable to pour the poor solvent in the emulsion.

There are no specific limitations on the method used to pour the poor solvent in this step if fine polymer particles to be produced are obtained. The useful methods include continuous dropping, split dropping, and batch addition. Continuous dropping and split dropping are preferable because they can prevent coagulation, fusion, or coalescence of the emulsion from being caused when adding the poor solvent, which may lead to a large particle diameter distribution or bulky grains larger than 1,000 μm. Continuous dropping is the most preferable method to implement efficiently in industrial fields.

The addition of the poor solvent should be finished within 10 minutes to 50 hours, preferably within 30 minutes to 10 hours, and more preferably within 1 hour to 5 hours. If it is finished in a shorter time than these ranges, the emulsion will be likely to undergo coagulation, fusion, or coalescence, which may lead to a large particle diameter distribution or bulky grains. Slower implementation than these is not practical in view of industrial requirements.

Implementation within these time ranges serves to prevent coagulation among particles when the emulsion is converted to fine polymer particles, and produce fine polymer particles with a narrow particle diameter distribution.

Depending on the state of the emulsion, the poor solvent added preferably accounts for 0.1 to 10 parts by mass, more preferably 0.1 to 5 parts by mass, more preferably 0.2 to 3 parts by mass, particularly preferably 0.2 part by mass to 1 part by mass, and most preferably 0.2 to 0.5 part by mass, relative to the total amount, i.e., 1 part by mass, of the emulsion.

There are no limitations on the duration of the contact between the poor solvent and the emulsion if it is sufficiently long for fine particles to precipitate. To achieve adequate precipitation and high productivity, the duration should be 5 minutes to 50 hours, preferably 5 minutes to 10 hours, more preferably 10 minutes to 5 hours, particularly preferably 20 minutes to 4 hours, extremely preferably 30 minutes to 3 hours, following the addition of the poor solvent.

Powder of the fine particles is recovered by subjecting the dispersion liquid of fine polymer particles thus obtained to solid-liquid separation with a generally known method such as filtration, decantation, reduced pressure filtration, compression filtration, centrifugal separation, centrifugal filtration, spray drying, acid precipitation, salt precipitation, and freezing.

For refining, the fine polymer particles obtained from the solid-liquid separation step are purified by washing in a solvent or the like as needed to remove impurities that are carried on the surface or contained. The poor solvent is preferable as the solvent for this step, and more preferable are water, methanol, and ethanol, which may be used singly or as a mixture.

The resulting particles may be dried to remove the residual solvent. This drying may be carried out with an appropriate method such as air-drying, heat-drying, reduced pressure drying, and freeze drying. The heating is performed preferably at a temperature lower than the glass transition point, specifically in the range of 50-150° C.

The method has the advantage that it is possible to recycle the organic solvent and the polymer B separated in the solid-liquid separation step carried out to produce powder of fine particles.

The solvent resulting from the solid-liquid separation is a mixture of the polymer B, organic solvent and poor solvent. If the poor solvent is removed from this mixture, the remaining liquid can be recycled as the solvent for emulsion production. The removal of the poor solvent is carried out with a generally known method, specifically, simple distillation, reduced pressure distillation, precision distillation, thin film distillation, extraction, or membrane separation. The preferable methods include simple distillation, reduced pressure distillation, and precision distillation.

If distillation operations such as simple distillation and reduced pressure distillation are performed, heat is applied to the liquid, possibly promoting heat decomposition of the polymer B or organic solvent. They are performed in an oxygen-free state, more preferably in an inactive atmosphere, if possible. Specifically, they should be carried out in nitrogen, helium, argon, or carbon dioxide.

For recycling, it is preferable that the poor solvent should be removed as much as possible. Specifically, the remaining poor solvent should account for 10 mass % or less, preferably 5 mass % or less, more preferably 3 mass % or less, and particularly preferably 1 mass % or less, of the total amount of the organic solvent and the polymer B to be recycled. A content larger than this range is not preferable because the fine particles can have a broader particle diameter distribution, or the particles can undergo coagulation.

The content of the poor solvent in the solvent mixture used for recycle can be measured with a generally known method such as gas chromatography and the Karl Fischer's method.

Loss of the organic solvent or the polymer B can take place during the operations for removing the poor solvent, and it is preferable to adjust appropriately the composition ratio to the initial value.

With respect to the particle diameter, it is possible to produce particles with a diameter of 1,000 μm or less commonly, 500 μm or less, 300 μm or less, 100 μm or less, and 50 μm or less. With respect to the lower limit, it is possible to produce particles with a diameter down to 50 nm commonly, 100 nm, 500 nm, 1 μm, and 10 μm.

With respect to the particle diameter distribution, it is possible to produce particles with a particle diameter distribution index of 3 or less, 2 or less, 1.5 or less, 1.2 or less, and 1.1 or less. The preferable lower limit is 1.

The average particle diameter of the fine particles can be determined by randomly selecting 100 particles in scanning electron microscope photographs and calculating the arithmetic average of their measured diameters. If there are particles of a shape that is not a perfect circle but an ellipse or the like, in the photograph, their major axis is taken as their diameter. For accurate determination of the particle diameter, measurements should be made at least at a magnification of 1,000 or more, preferably 5,000 or more.

The particle diameter distribution index is calculated from the particle diameter thus determined, using the undermentioned conversion equation:

Equation 1

$$Dn = \sum_{i=1}^{n} Ri/n \qquad (1)$$

$$Dv = \sum_{i=1}^{n} Ri^4 / \sum_{i=1}^{n} Ri^3 \qquad (2)$$

$$PDI = Dv/Dn. \qquad (3)$$

In the equation, Ri represents the particle diameter of each particle, n the number of particles observed (100), Dn the number average particle diameter, Dv the volume average particle diameter, and PDI the particle diameter distribution index.

In this fine particle production method, fine particles are produced from an emulsion comprising of the polymer A solution phase and the polymer B solution phase. The method is useful to produce fine particles of an amorphous polymer with a narrow particle diameter distribution and an average particle diameter of 0.5 μm or more that have been difficult to produce with the conventional methods.

In particular, it is useful for amorphous polymers with a glass transition point of 100° C. or more, preferably 150° C. or more, and more preferably 180° C. or more. For the upper limit, it is preferably 400° C. or less in view of solubility.

In recent years, in particular, material of fine polymer particles with a narrow particle diameter distribution and high heat resistance are required in many uses. Vinyl polymers are crosslinked in many cases and special monomers are used to solve the problem. Such polymers will lose thermoplasticity and cannot be used for many purposes, and accordingly, there are demands for novel fine polymer particles. The method is useful to solve these problems.

The glass transition point referred to here is determined by differential scanning calorimetry (DSC). A specimen is heated from 30° C. up to a temperature higher by 30° C. or more than the predicted glass transition point at a heating rate of 20° C./min, held there for 1 minute, then cooled to 0° C. at a rate of 20° C./min, held there for 1 minute, and heated again at a rate of 20° C./min while making measurements to determine the glass transition point (Tg).

The method is also useful in that it can produce fine polymer particles with a narrow particle diameter distribution of thermoplastic resins including polyethersulfone, polycarbonate, amorphous non-totally aromatic polyamide, polyphenylene ether, polyetherimide, amorphous polyarylate, polyamide-imide, and polyether ketone, which cannot be produced by the conventional methods.

The method also serves to produce fine polymer particles having a narrow particle diameter distribution and an average particle diameter of more than 10 μm and consisting of daughter particles contained in the fine polymer particles For easy particle production with the method, the preferable size range of the fine polymer particles containing daughter particles is more than 10 μm, more preferably 15 μm or more, still more preferably 20 μm or more, and particularly preferably 25 μm or more. The upper limit should be 1,000 μm or less, preferably 500 μm or less, more preferably 300 μm or less, and particular preferably 100 μm or less.

Relative to the fine polymer particles, the average particle diameter of the daughter particles should be ⅓ or less, preferably ¼ or less, more preferably ⅕ or less, particularly preferably ⅛ or less, and extremely preferably 1/10.

If in this range, the fine polymer particles are sufficiently large to contain the daughter particles.

The average particle diameter of the daughter particles can be measured with a particle size distribution gauge or scanning electron microscope before addition. If the particle diameter of the daughter particles is too small to observe with this method, the magnification should be increased to up to a degree where observation is possible, or a transmission electron microscope should be used for observation, followed by determination with a similar method.

To check whether the fine polymer particles contain daughter particles, they are embedded in epoxy resin or the like, and ultrathin sections are prepared for observation with an electronic microscope. They are observed by scanning electron microscopy, or if it is difficult, by transmission electron microscopy.

The particle diameter of the daughter particles in the fine polymer particles is determined from observation of the ultrathin sections for electronic microscope observation. In this observation, the particle diameter seen in the photograph does not always represent the equatorial cross section of the daughter particle. Therefore, the maximum particle diameter observed in the photograph is taken as the particle diameter of the daughter particles.

When the particle diameter of daughter particles is measured from ultrathin section observations, 100 or more daughter particles should be observed and the maximum length should be taken the particle diameter of the daughter particles.

With respect to the material of the daughter particles, they may be inorganic particles or organic particles, but organic particles are preferable, and particles of rubbery polymer are particularly useful. Typical ones include fine particles of rubbery polymer contained in ABS resin. To include inorganic particles or organic particles in fine particles, the particles is mixed with the polymer A in advance, followed by dissolving them in an organic solvent, or the polymer A is dissolved in a liquid consisting of an organic solvent and inorganic particles or organic particles dispersed in it.

When using the method to produce vinyl polymer particles with a narrow particle diameter distribution, it is possible to synthesize particles of 10 μm or more, which have been difficult to produce with a building-up type fine polymer particle production method such as emulsion polymerization. If this technique is applied to such resin, it is possible to produce easily particles with a diameter of 10 μm to 1,000 μm, 15 μm to 500 μm, 20 μm to 100 μm, and 25 μm to 80 μm.

Thus, the method can be applied in industrial and various other fields as it can produce fine particles with a narrow particle diameter distribution and, in particular, it serves to manufacture fine particles of polymers that have been conventionally difficult to process into such particles, or fine particles of highly heat resistant polymers.

In some cases, the examples in which "the polymer A is an aromatic polyethersulfone with functional hydroxy phenyl terminal groups accounting for 60% or more or an aromatic polyethersulfone with chlorophenyl terminals accounting for 100%, the polymer B being polyvinyl alcohol, and the organic solvent being dimethyl sulfoxide or N-methylpyrolidone" described in Comparative Example 6, Comparative Example 7 and Comparative Example 9 in WO 2009/022591 and Examples 55 to 59 in WO 2009/022591 can be excluded from the first part of the method. Described below is the second part.

The aromatic polyethersulfone particles (hereinafter abbreviated as PES particles) are produced by precipitating an aromatic polyethersulfone (hereinafter abbreviated as PES) under the coexistence of a surface active agent with a number average molecular weight of 1,000 or more.

The PESs have a structure as represented by Formula (a-1) and/or Formula (a-2):

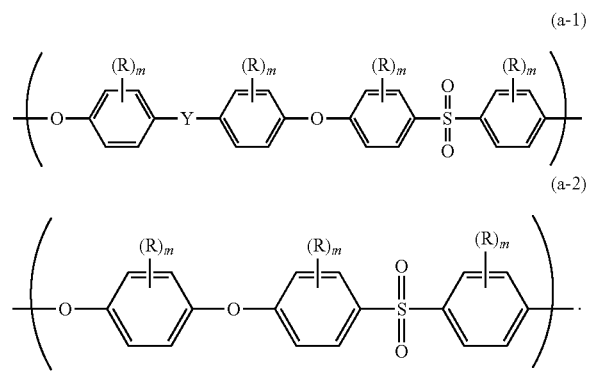

In the formulae, R's, which may be identical or different, each represent an alkyl group with a carbon number of 1 to 6 or an aryl group with a carbon number of 6 to 8, and m denotes an integer of 0 to 3. Y is one selected from the group of direct bond, oxygen, sulfur, $SO_2$, CO, $C(CH_3)_2$, $CH(CH_3)$, and $CH_2$.

The molecular weight of the PES is preferably such that the PES in a DMF solution of 25° C. and 1 g/dl has a reduced viscosity in the range of 0.10 to 1.00 as measured with an Ostwald capillary viscometer (according to the procedure as described in JIS K 7367-1 (2002)).

Such a PES can be commonly produced with a generally known method. The products of PES produced with a generally known method include, for instance, the Ultrason E series, supplied by BASF, and the Sumikaexcel series supplied by Sumitomo Chemical Co., Ltd.

The surface active agent should have a number average molecular weight of 1,000 or more. The number average molecular weight of the surface active agent is more preferably in the range of 2,000 or more. A number average molecular weight smaller than the range is not preferable because the resulting PES particles tend to have a large particle diameter or a broad particle diameter distribution. The number average molecular weight referred to here is calculated from a curve of gel permeation chromatography compared with a calibration curve based on polyethylene glycol.

There are no specific limitations on the surface active agent if it is in the range. The useful ones include, for instance, anionic, cationic, nonionic, or ampholytic synthetic compounds such as polyacrylic acid, polymethacrylic acid, polystyrene sulfonic acid, polystyrene-maleic acid) copolymer, sodium polyacrylate, sodium polystyrene sulfonate, polyvinyl pyrolidone, polyethylene imine, polyacrylic amide, polymethacryl amide, polyvinyl pyridine, polyvinyl pyridinium chloride, polyethylene glycol, fully saponified or partly saponified polyvinyl alcohol, fully saponified or partly saponified polyvinyl alcohol-ethylene copolymer, and copolymers containing the segments; anionic, cationic, nonionic, or ampholytic semisynthetic compounds such as methyl cellulose, carboxymethyl cellulose, sodium carboxymethyl cellulose; and anionic, cationic, nonionic, or ampholytic natural compounds such as cellulose, chitosan, sodium alginate, dextrin, and casein. These may be singly or as a mixture of two or more of them. In particular, the preferable ones include fully saponified or partially saponified polyvinyl alcohol, fully saponified or partially saponified polyvinyl alcohol-ethylene copolymer, polyethylene glycol, and polyvinyl pyrolidones, which may be singly or as a mixture of two or more thereof.

The methods to precipitate a PES under the coexistence of a surface active agent include, for instance, the following:
(1) Melting a PES, and cooling it to cause precipitation.
(2) Dissolving a PES in a solvent, and removing the solvent to cause precipitation.
(3) Dissolving a PES in a solvent, and adding a solvent that is incompatible with the PES to cause precipitation.
(4) Dissolving a PES in a solvent, adding a solvent that is incompatible with the PES and the solvent used to dissolve the PES to form an emulsion, and removing the solvent used to dissolve the PES to cause precipitation.

There are no limitations on the method and procedure of adding the surface active agent if it coexists with the PES when it is precipitated. For easy operations, the method of "(3) Dissolving a PES in a solvent, and adding a solvent that is incompatible with the PES to cause precipitation" is used preferably.

Preferable methods for production of PES particles are described below.

Described first is a step in which a PES and a surface active agent are mixed in a first solvent to prepare a uniform solution or suspension liquid of the PES.

The first solvent is preferably such that the solubility of PES is 100 mass % at 25° C. This solvent is either an aprotic polar solvent, or a mixed solvent of an aprotic polar solvent and another solvent that is compatible with the aprotic polar solvent. Specifically, such aprotic polar solvents include N-methylpyrolidone (NMP), N,N-dimethyl formamide (DMF), N,N-dimethyl acetamide, 1,3-dimethyl-2-imidazolidinone, dimethyl sulfoxide (DMSO), and sulfolane, which may be used singly or as a mixed solvent of two or more thereof.

The another solvent that is compatible with the aprotic polar solvent has a solubility in the aprotic polar solvent of 99 mass % or more at 25° C. There are no specific limitations on the solvent if it is in the range. Examples include, for instance, aliphatic hydrocarbon solvents such as pentane, hexane, heptane, octane, cyclohexane, cyclopentane, decane, dodecane, tridecane, and tetradecane; aromatic hydrocarbon solvents such as benzene, toluene, xylene, 2-methyl naphthalene, and cresol; ether solvents such as diethyl ether, tetrahydrofuran, diisopropyl ether, and dioxane; ketone solvents such as acetone, and methyl ethyl ketone; alcohol solvents such as methanol, ethanol, isopropanol, and n-propanol; ester solvents such as ethyl acetate, methyl acetate, butyl acetate, butyl propionate, and butyl butyrate; halogen solvents such as chloroform, bromoform, 1,2-dichloromethane, 1,2-dichloroethane, carbon tetrachloride, chlorobenzene, and hexafluoroisopropanol; and water; which may be used singly or as a mixed solvent of two or more thereof.

There are no specific limitations on the surface active agent if its number average molecular weight is 1000 or more, and those described above can be useful. The particularly preferable ones include fully saponified or partially saponified polyvinyl alcohol, fully saponified or partially saponified polyvinyl alcohol-ethylene copolymer, polyethylene glycol, and polyvinyl pyrolidones, which may be used singly or as a mixed solvent of two or more thereof.

With respect to the content of the surface active agent, it preferably accounts for 1 to 200 parts by mass, more preferably 30 to 200 parts by mass, relative to 100 parts by mass of the PES. A content smaller than the range is not preferable because the resulting PES tends to be in the form of bulky aggregates, instead of particles, with a broad particle diameter distribution. A content larger than the range is not preferable because the surface active agent will not dissolve easily in the first solvent.

In the uniform solution or suspension liquid of a PES, the PES preferably accounts for 30 parts by mass or less, more preferably 20 parts by mass or less, relative to 100 parts by mass of the first solvent. A PES content larger than the range is not preferable because the resulting PES tends to be in the form of bulky aggregates, instead of particles.

Described below is a step in which a second solvent different from the solvent is added to the uniform solution or suspension liquid of a PES to cause precipitation of PES particles.

When the second solvent is added, the temperature of the uniform solution or suspension liquid of a PES is preferably 0 to 100° C., more preferably 10 to 80° C. If the uniform solution or suspension liquid of a PES has a temperature higher than the range, it is not preferable because the resulting PES will be in the form of bulky aggregates instead of particles.

The second solvent should be such that the solubility of PES is 1 mass % or less at 25° C. Such solvents include, for instance, aliphatic hydrocarbon solvents such as pentane, hexane, heptane, octane, cyclohexane, cyclopentane, decane, dodecane, tridecane, and tetradecane; aromatic hydrocarbon solvents such as benzene, toluene, xylene, and 2-methyl naphthalene; ether solvents such as diethyl ether, tetrahydrofuran, diisopropyl ether, and dioxane; ketone solvents such as acetone, and methyl ethyl ketone; alcohol solvents such as methanol, ethanol, isopropanol, and n-propanol; ester solvents such as ethyl acetate, methyl acetate, butyl acetate, butyl propionate, and butyl butyrate; halogen solvents such as chloroform, bromoform, 1,2-dichloromethane, 1,2-dichloroethane, carbon tetrachloride, and chlorobenzene; and water; which may be used singly or as a mixed solvent of two or more thereof. Of these, the preferable ones include water, methanol, and ethanol, which may be used singly or as a mixed solvent of two or more thereof. The second solvent may contain the first solvent if the solubility of the PES is 1 mass % or less.

With respect to the content of the second solvent, it preferably accounts for 10 parts by mass or more, more preferably 15 parts by mass or more, relative to 100 parts by mass of the uniform solution or suspension liquid of a PBS. PES particles will not precipitate if the content is smaller than the range.

The rate of adding the second solvent is preferably 10 parts by mass/min or less, more preferably 5 parts by mass/min or less, for 100 parts by mass of the uniform solution or suspension liquid of a PES. An adding rate higher than the range is not preferable because the resulting PES will be in the form of bulky aggregates instead of particles.

Thus, a PES particle dispersion liquid can be produced by mixing a PES, surface active agent, and first solvent to provide a uniform solution or suspension liquid of the PES, and adding a second solvent to cause precipitation of PES particles.

Described below is a step to separate PES particles from the PES particle dispersion liquid. A generally known technique for solid-liquid separation, washing, or drying may be used for the separation step. It is described in detail below.

The methods used to separate PES particles from the first solvent, second solvent, and surface active agent include, for instance, filtration, decantation, centrifugal separation, acid precipitation, salt precipitation, spray-drying, and freezing.

Adequate washing should be carried out to prevent the PES particles from remaining in the first solvent and surface active agent.

Washing is preferably carried out with the second solvent, more preferably with one or a mixture of two or more selected from the group of water, methanol, and ethanol.

After the solid-liquid separation, the solvents may be recovered and recycled for the PES particle produce step or the PES particle washing step. This can serve to improve the productivity.

The useful PES particle drying methods include, for instance, air-drying, heat-drying, reduced pressure drying, and freeze-drying. The heating is preferably performed at a temperature lower than the glass transition point, specifically 50 to 150° C.

Thus, PES particles can be obtained with the method described above.

The production method serves to produce PES particles that have a number average particle diameter 0.1 to 50 μm, particle diameter distribution index of 1.0 to 1.5, and uniform particle diameter distribution.

The PES particles more preferably have a number average particle diameter in the range of 0.1 to 30 μm. Handleability can deteriorate if the number average particle diameter is smaller than the range. A number average particle diameter larger than the range is not preferable because the particle diameter distribution becomes broader. The number average particle diameter of the PES particles can be determined by randomly selecting 100 particles in a scanning electron microscope photograph, measuring their diameter, and making calculations according to Equation (1). The major axis of the particles is measured if their shape is not a perfect circle. In particular, the method serves to produce particles with a number average particle diameter 10 to 50 μm.

The PES particles more preferably have a particle diameter distribution index in the range of 1.0 to 1.3. The particles have more uniform particle diameters as the particle diameter distribution index comes closer to 1. A particle diameter distribution index larger than the range is not preferable because the particles will have a broader diameter distribution and fail to have uniform particle diameters. Having uniform particle diameters is preferable because the particles are likely to show better performance than expected, when used in an additive for polymer alloys, light diffusion agent, spacer for liquid crystal display, toner, or catalyst carrier. The particle diameter distribution index is calculated as the ratio of the volume average particle diameter to the number average particle diameter according to Equation (3). The volume average particle diameter is determined by measuring the diameter of randomly selected 100 particles in scanning electron microscope photographs and making calculations according to Equation (2). The major axis of the particles is measured if their shape is not a perfect circle.

Equation 2

$$Dn = \sum_{i=1}^{n} Ri/n \quad (1)$$

$$Dv = \sum_{i=1}^{n} Ri^4 / \sum_{i=1}^{n} Ri^3 \quad (2)$$

$$PDI = Dv/Dn. \quad (3)$$

In the equation, Ri: diameter of each particle, n: number of measurements (100), Dn: number average particle diameter, Dv: volume average particle diameter, and PDI: particle diameter distribution.

The PES particles can be used as material for an adhesive, paint, dispersion liquid in printing inks, light diffusion agent, spacer for liquid crystal display, delustering agent, additive for polymer alloys, carrier for various catalysts, toner for electrophotography, carrier for chromatography, automobile component, aircraft component, electronic component, base for cosmetics, and carrier for medical applications. With their uniform particle diameter distribution, in particular, they can have better effects than expected, when used as material for an additive for polymer alloys, light diffusion agent, spacer for liquid crystal display, or toner.

EXAMPLES

Our methods and fine polymer particles will now be illustrated in greater detail with reference to Examples, but it should be understood that the disclosure is not construed as being limited thereto.

(1) Measuring Methods for Average Particle Diameter and Particle Diameter Distribution The particle diameter of each fine particle was determined from observations made by scanning electron microscopy (with JSM-6301NF scanning electron microscope, supplied by JEOL Ltd.) at a magnification of 1,000. The major axis of the particle was measured if its shape was not a perfect circle.

The average particle diameter was determined measuring the diameters of 100 randomly selected particles in scanning electron microscope photographs and calculating their arithmetic average.

The particle diameter distribution index, which represents the particle diameter distribution, was calculated from the diameter of each particle measured above according to the following conversion equation:

Equation 3

$$Dn = \sum_{i=1}^{n} Ri/n \quad (1)$$

$$Dv = \sum_{i=1}^{n} Ri^4 / \sum_{i=1}^{n} Ri^3 \quad (2)$$

$$PDI = Dv/Dn. \quad (3)$$

In the equation, Ri represents diameter of each particle, n the number of measurements (100), Dn the number average particle diameter, Dv the volume average particle diameter, and PDI the particle diameter distribution index.

(2) Observation of Particle's Cross Section

The particle's cross section was observed by transmission electron microscopy (H-7100 supplied by Hitachi, Ltd.).

(3) Confirmation of Existence of Daughter Particles

Fine polymer particles were embedded in epoxy resin for electron microscopy, and specimens for transmission electron microscopy were sliced off. Their dispersion structure was observed by transmission electron microscopy to confirm the existence of particles. In the specimen, 100 daughter particles were selected randomly, and the size of each particle was measured. The maximum length across each daughter particle was taken its diameter.

(4) Determination of Interfacial Tension

A DM-501 automatic contact angle gauge, supplied by Kyowa Interface Science Co., Ltd. was used to measure the surface tension of the polymer A solution phase and the polymer B solution phase exposed to air according to the hanging-drop method. The interfacial tension was calculated as the absolute value of the difference $(r_1-r_2)$ between their measured surface tension, $r_1$ and $r_2$.

(5) Water Content in Solvent

The water content in the recycled solvent was measured according to the Karl Fischer's method (using CA-06 moisture meter, supplied by Mitsubishi Chemical Corporation).

(6) Qualitative Analysis of Particles

Qualitative analysis of mixed particles of epoxy resin and polyamide was carried out by infrared spectrophotometry (System 2000, supplied by PerkinElmer Japan Co., Ltd.).

(7) Reduced Viscosity $(\eta_{sp}/c)$

The reduced viscosity was measured in dimethyl formamide (DMF) under the conditions of 25° C. and 1 g/dl according to the procedure described in JIS K 7367-1 (2002) using an Ostwald capillary viscometer.

The reduced viscosity $(\eta_{sp}/c)$ was determined according to the following equation, and the average of five measurements was used:

$$\eta_{sp}/c=(t-t_0)/t_0/c$$

t: time required for polymer solution to move between gage marks in viscometer (seconds)

$t_0$: time required for pure solvent to move between gage marks in viscometer (seconds)

c: concentration of polymer solution (g/dl).

(8) Measurement of Number Average Molecular Weight of Surface Active Agent

The number average molecular weight of the surface active agent was determined by gel permeation chromatography according to a calibration curve based on polyethylene glycol.

Equipment: LC-10A series, supplied by Shimadzu Corporation

Column: GF-7 MHQ, supplied by Showa Denko K.K.

Mobile phase: water

Flow rate: 1.0 ml/min

Detector: differential refractometer.

Example 1

Production Method for Polyethersulfone Fine Particles

Figure 2:
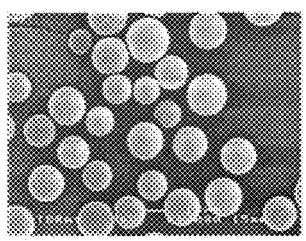
FIG. 2 shows a scanning electron microscope photograph of the fine polyethersulfone particles produced in Example 1.

A 2.5 g quantity of polyethersulfone (weight average molecular weight 67,000, Sumikaexcel (registered trademark) 5003P, supplied by Sumitomo Chemical Co., Ltd.) as the polymer A, 45 g of N-methyl-2-pyrolidone as organic solvent, and 2.5 g of polyvinyl alcohol (supplied by Nippon Synthetic Chemical Industry Co., Ltd., Gohsenol (registered trademark) GL-05, weight average molecular weight 10,600, SP value 32.8 $(J/cm^3)^{1/2}$) as the polymer B were put in a 100 ml four-neck flask, heated at 80° C., and stirred until the polymer dissolved. After cooling the liquid down to room temperature, 50 g of ion-exchanged water, used as poor solvent, was dropped through a liquid feeding pump at a rate of 0.41 g/min while stirring it at 450 rpm. The liquid turned to white when about 12 g of ion-exchanged water had been added. After adding all volume of the water, stirring was continued for 30 minutes, and the resulting suspension liquid was filtered and washed with 100 g of ion-exchanged water. The material separated was vacuum-dried at 80° C. for 10 hours, thereby providing 2.0 g of a white solid. The powder thus prepared was fine particles in a perfect spherical shape when observed by scanning electron microscopy (FIG. 2). They were fine particles of polyethersulfone with an average particle diameter of 18.7 µm and a particle diameter distribution index of 1.07. It was impossible to measure the heat of fusion of the polyethersulfone produced in this Example, and the SP value of this polymer was determined by the measurement-based method to be 25.8 $(J/cm^3)^{1/2}$. Elsewhere, the polymer A and the polymer B were dissolved in this organic solvent and left to stand. Observation showed that the liquid was separated into two phases at a volume ratio of 3/7 (polymer A solution phase/polymer B solution phase (ratio by volume)), and the interfacial tension in the liquid was estimated at 2 mN/m or less. The solubility (at room temperature) of the polyethersulfone in water, i.e., a poor solvent, was 0.1 mass % or less.

Example 2

Production Method 2 for Polyethersulfone Fine Particles

A 2.5 g quantity of polyethersulfone (weight average molecular weight 67,000, Sumikaexcel (registered trademark) 5003P, supplied by Sumitomo Chemical Co., Ltd.) as the polymer A, 46.5 g of N-methyl-2-pyrolidone as organic solvent, and 1.0 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved. After cooling the liquid down to room temperature, 50 g of ion-exchanged water, used as poor solvent, was dropped through a liquid feeding pump at a rate of 0.41 g/min while stirring it at 450 rpm. The liquid turned to white when about 12 g of the ion-exchanged water had been added. After adding all volume of the water, stirring was continued for 30 minutes, and the resulting suspension liquid was filtered and washed with 100 g of ion-exchanged water. The material separated was vacuum-dried at 80° C. for 10 hours, thereby providing 2.1 g of a white solid. The powder thus prepared was fine particles in a perfect spherical shape when observed by scanning electron microscopy. They were fine particles of polyethersulfone with an average particle diameter of 36.0 µm and a particle diameter distribution index of 1.25. Elsewhere, the polymer A and the polymer B were dissolved in this organic solvent and left to stand. Observation showed that the liquid was separated into two phases, and the interfacial tension in the liquid was estimated at 2 mN/m or less.

Example 3

Production Method 3 for Polyethersulfone Fine Particles

A 2.5 g quantity of polyethersulfone (weight average molecular weight 67,000, Sumikaexcel (registered trademark) 5003P, supplied by Sumitomo Chemical Co., Ltd.) as the polymer A, 45 g of dimethyl sulfoxide as organic solvent, and 2.5 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved. After cooling the liquid down to room temperature, 50 g of ion-exchanged water, used as poor solvent, was dropped through a liquid feeding pump at a rate of 0.41 g/min while stirring it at 450 rpm. The liquid turned to white when about 12 g of the ion-exchanged water had been added. After adding all volume of the water, stirring was continued for 30 minutes, and the resulting suspension liquid was filtered and washed with 100 g of ion-exchanged water. The material separated was vacuum-dried at 80° C. for 10 hours, thereby providing 2.2 g of a white solid. The powder thus prepared was fine particles in a perfect spherical shape when observed by scanning electron microscopy. They were fine particles of polyethersulfone with an average particle diameter of 18.4 µm and a particle diameter distribution index of 1.08. Elsewhere, the polymer A and the polymer B were dissolved in this organic solvent and left to stand. Observation showed that the liquid was separated into two phases, and the interfacial tension in the liquid was estimated at 2 mN/m or less.

Example 4

Production Method 4 for Polyethersulfone Fine Particles

A 2.5 g quantity of polyethersulfone (weight average molecular weight 67,000, Sumikaexcel (registered trademark) 5003P, supplied by Sumitomo Chemical Co., Ltd.) as the polymer A, 45 g of N-methyl-2-pyrolidone as organic solvent, and 2.5 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved. After cooling the liquid down to room temperature, 50 g of methanol, used as poor solvent, was dropped through a liquid feeding pump at a rate of 0.41 g/min while stirring it at 450 rpm. The liquid turned to white when about 10 g of the methanol had been added. After adding all volume of the methanol, stirring was continued for 30 minutes, and the resulting suspension liquid was filtered and washed with 100 g of ion-exchanged water. The material separated was vacuum-dried at 80° C. for 10 hours, thereby providing 2.2 g of a white solid. The powder thus prepared was fine particles in a perfect spherical shape when observed by scanning electron microscopy. They were fine particles of polyethersulfone with an average particle diameter of 22.9 µm and a particle diameter distribution index of 1.09.

Example 5

Production Method 5 for Polyethersulfone Fine Particles

A 2.5 g quantity of polyethersulfone (weight average molecular weight 67,000, Sumikaexcel (registered trademark) 5003P, supplied by Sumitomo Chemical Co., Ltd.) as the polymer A, 450 g of N-methyl-2-pyrrolidone as organic solvent, and 25 g of polyvinyl alcohol (supplied by Nippon Synthetic Chemical Industry Co., Ltd., Gohsenol (registered trademark) GL-05) as the polymer B were put in a 1,000 ml four-neck flask, heated at 80° C., and stirred until the polymer dissolved. After cooling the liquid down to room temperature, 500 g of ion-exchanged water, used as poor solvent, was dropped through a liquid feeding pump at a rate of 4.1 g/min while stirring it at 450 rpm. The liquid turned to white when about 130 g of the ion-exchanged water had been added. After adding all volume of the water, stirring was continued for 30 minutes, and the resulting suspension liquid was filtered and washed with 900 g of ion-exchanged water. The material separated was vacuum-dried at 80° C. for 10 hours, thereby providing 22.1 g of a white solid. The filtrate was stored for use in Example 15. The powder thus prepared was fine particles in a perfect spherical shape when observed by scanning electron microscopy. They were fine particles of polyethersulfone with an average particle diameter of 19.7 μm and a particle diameter distribution index of 1.06. Elsewhere, the polymer A and the polymer B were dissolved in this organic solvent and left to stand. Observation showed that the liquid was separated into two phases.

Example 6

Production Method for Polycarbonate Fine Particles

Figure 3:
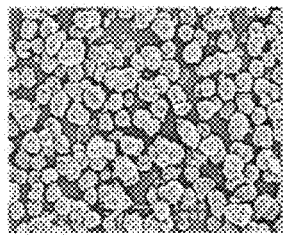
FIG. 3 shows a scanning electron microscope photograph of the fine polycarbonate particles produced in Example 6.

A 2.5 g quantity of polycarbonate (weight average molecular weight 45,000, Iupilon (registered trademark) E2000, supplied by Mitsubishi Engineering-Plastics Corporation) as the polymer A, 45 g of N-methyl-2-pyrrolidone as organic solvent, and 2.5 g of polyvinyl alcohol (supplied by. Nippon Synthetic Chemical Industry Co., Ltd., Gohsenol (registered trademark) GL-05) as the polymer B were put in a 100 ml four-neck flask, heated at 80° C., and stirred until the polymer dissolved. After cooling the liquid down to room temperature, 50 g of ion-exchanged water, used as poor solvent, was dropped through a liquid feeding pump at a rate of 0.41 g/min while stirring it at 450 rpm. The liquid turned to white when about 12 g of the ion-exchanged water had been added. After adding all volume of the water, stirring was continued for 30 minutes, and the resulting suspension liquid was filtered and washed with 100 g of ion-exchanged water. The material separated was vacuum-dried at 80° C. for 10 hours, thereby providing 2.15 g of a white solid. The powder thus prepared was fine particles with a rough surface (FIG. 3) when observed by scanning electron microscopy. They were fine particles of polycarbonate with an average particle diameter of 9.6 μm and a particle diameter distribution index of 1.12. It was impossible to observe the heat of fusion of the polycarbonate used in this Example, and this polymer had a SP value of 23.0 $(J/cm^3)^{1/2}$. Elsewhere, the polymer A and the polymer B were dissolved in this organic solvent and left to stand. Observation showed that the liquid was separated into two phases, i.e., the polymer A phase and the polymer B phase. The solubility (at room temperature) of the polycarbonate in water, i.e., a poor solvent, was 0.1 mass % or less.

Example 7

Figure 4:
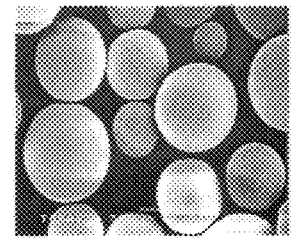
FIG. 4 shows a scanning electron microscope photograph of the fine ABS particles produced in Example 7.
Figure 5:
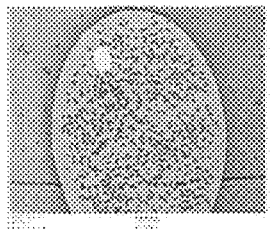
FIG. 5 shows a transmission electronic microscope photograph of the fine ABS particles produced in Example 7.

Production Method for ABS (Acrylonitrile-Butadiene-Styrene) Resin Fine Particles A 2.5 g quantity of ABS resin (composed of a rubber-containing graft copolymer with an average particle diameter of 300 nm dispersed in the matrix of a polyacrylonitrile-styrene) copolymer with a weight average molecular weight of 110,000, Toyolac (registered trademark) T100 supplied by Toray Industries, Inc.) as the polymer A, 45 g of N-methyl-2-pyrrolidone as organic solvent, and 2.5 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved. After cooling the liquid down to room temperature, 50 g of ion-exchanged water, used as poor solvent, was dropped through a liquid feeding pump at a rate of 0.41 g/min while stirring it at 450 rpm. The liquid turned to white when about 12 g of the ion-exchanged water had been added. After adding all volume of the water, stirring was continued for 30 minutes, and the resulting suspension liquid was filtered and washed with 100 g of ion-exchanged water. The material separated was vacuum-dried at 80° C. for 10 hours, thereby providing 1.85 g of a white solid. The powder thus prepared was fine particles of a perfect spherical shape (FIG. 4) when observed by scanning electron microscopy. They were fine particles of ABS resin with an average particle diameter of 28.6 μm and a particle diameter distribution index of 1.19. Ultrathin sections for electron microscopy were prepared and the cross section of the particles was observed by transmission electronic microscopy. As shown in FIG. 5, they contained daughter particles, and the photograph indicated that the particle diameter of the daughter particles was 0.92 μm while the particle diameter ratio between the daughter particles and the fine polymer particles was 0.033. It was impossible to observe the heat of fusion of the ABS resin used in this Example, and the SP value of this polymer as poly(acrylonitrile-styrene) was estimated by the calculation-based method to be 24.3 $(J/cm^3)^{1/2}$. Elsewhere, the polymer A and the polymer B were dissolved in this organic solvent and left to stand. Observation showed that the liquid was separated into two phases. The solubility (at room temperature) of the polycarbonate in water, i.e., a poor solvent, was 0.1 mass % or less.

Example 8

Production Method 1 for Polyamide Particles

Figure 6:
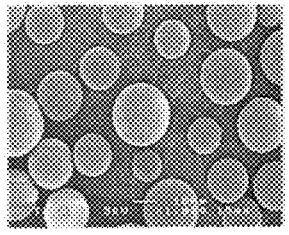
FIG. 6 shows a scanning electron microscope photograph of the fine amorphous polyamide particles produced in Example 8.
Figure 7:
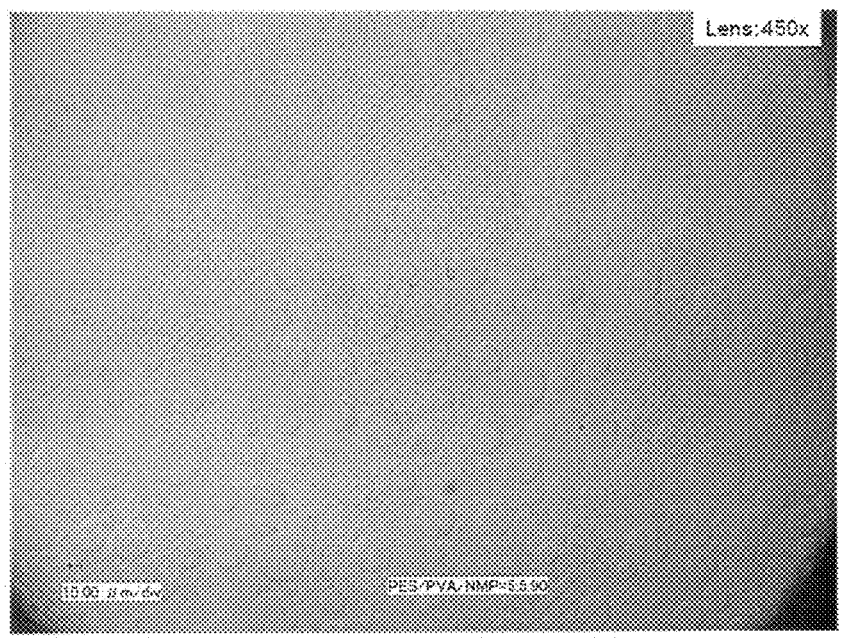
FIG. 7 shows an optical microscope photograph of emulsion particles produced by vibrating a liquid consisting of a polymer A, polymer B, and organic solvent in an amorphous polyamide based system produced in Example 8.

A 2.5 g quantity of amorphous polyamide (weight average molecular weight 18,000, Grilamide (registered trademark) TR55, supplied by EMS Werke, Inc.) as the polymer A, 45 g of N-methyl-2-pyrrolidone as organic solvent, and 25 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved. After cooling the liquid down to room temperature, 50 g of ion-exchanged water, used as poor solvent, was dropped through a liquid feeding pump at a rate of 0.41 g/min while stirring it at 450 rpm. The liquid turned to white when 12 g of ion-exchanged water had been added. After adding all volume of the water, stirring was continued for 30 minutes, and the resulting suspension liquid was filtered, washed with 100 g of ion-exchanged water, and vacuum-dried at 80° C. for 10 hours, thereby providing 2.25 g of a white solid. The powder thus prepared was fine particles in a perfect spherical shape when observed by scanning electron microscopy, as shown in FIG. 6. They were fine particles of amorphous polyamide with an average particle diameter of 24.3 μm and a particle diameter distribution index of 1.13. It was impossible to observe the heat of fusion of the amorphous polyamide produced in this Example, and the SP value of this polymer was determined by the calculation-based method to be 23.3 $(J/cm^3)^{1/2}$. Elsewhere, the polymer A and the polymer B were dissolved in this organic solvent and left to stand. Observation showed that the liquid was separated into two phases at a volume ratio of 3/7 (polymer A solution phase/polymer B solution phase (ratio by volume)), and the interfacial tension in the liquid was estimated at 2 mN/m or less. This two-phase liquid was vibrated by simple operation. FIG. 7 shows an optical microscope photograph of the resulting emulsion. The solubility (at room temperature) of the amorphous polyamide in water, i.e., a poor solvent, was 0.1 mass % or less.

Example 9

Production Method for Polyphenylene Ether Fine Particles

A 2.5 g quantity of poly(2,6-dimethyl phenylene ether) (weight average molecular weight 55,000) as the polymer A, 45 g of N-methyl-2-pyrolidone as organic solvent, and 2.5 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved completely. After cooling the liquid down to room temperature, 50 g of ion-exchanged water, used as poor solvent, was dropped through a liquid feeding pump at a rate of 0.41 g/min while stirring it at 450 rpm. The liquid turned to white when 12 g of the ion-exchanged water had been added. After adding all volume of the water, stirring was continued for 30 minutes, and the resulting suspension liquid was filtered, washed with 100 g of ion-exchanged water, and vacuum-dried at 80° C. for 10 hours, thereby providing 2.25 g of a white solid. Observation by scanning electron microscopy showed that the powder was fine particles of poly(2,6-dimethyl phenylene ether) with an average particle diameter of 8.6 μm and a particle diameter distribution index of 1.11. It was impossible to observe the heat of fusion of the polyphenylene ether used in this Example, and this polymer had a SP value of 20.7 $(J/cm^3)^{1/2}$ as estimated by the calculation-based method. Elsewhere, the polymer A and the polymer B were dissolved in this organic solvent and left to stand. Observation showed that the liquid was separated into two phases, i.e., the polymer A phase and the polymer B phase. The solubility (at room temperature) of the polyphenylene ether in water, i.e., a poor solvent, was 0.1 mass % or less.

Example 10

Production Method for Polyetherimide Particles

A 2.5 g quantity of polyetherimide (weight average molecular weight 55,000, Ultem 1010, supplied by GE Plastics) as the polymer A, 45 g of N-methyl-2-pyrolidone as organic solvent, and 2.5 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved completely. After cooling the liquid down to room temperature, 50 g of ion-exchanged water, used as poor solvent, was dropped through a liquid feeding pump at a rate of 0.41 g/min while stirring it at 450 rpm. The liquid turned to white when 12 g of the ion-exchanged water had been added. After adding all volume of the water, stirring was continued for 30 minutes. A 50 g quantity of water was added at once, and the resulting suspension liquid was put in a centrifugal separator and subjected to centrifugal separation for 20 minutes at a force 20,000 times the gravity force, and the supernatant was removed. The resulting solid was filtered, washed with 100 g of ion-exchanged water, and vacuum-dried at 80° C. for 10 hours, thereby providing 2.1 g of a white solid. The powder thus prepared was fine particles in a perfect spherical shape when observed by scanning electron microscopy. They were fine particles of polyetherimide with an average particle diameter of 0.7 μm and a particle diameter distribution index of 1.13. It was impossible to observe the heat of fusion of the polyetherimide used in this Example, and this polymer had a SP value of 24.0 $(J/cm^3)^{1/2}$ as estimated by the measurement-based method. Elsewhere, the polymer A and the polymer B were dissolved in this organic solvent and left to stand. Observation showed that the liquid was separated into two phases, i.e., the polymer A phase and the polymer B phase. The solubility (at room temperature) of the polyetherimide in water, i.e., a poor solvent, was 0.1 mass % or less.

Example 11

Production Method for Polyacrylonitrile Fine Particles

A 2.5 g quantity of polyacrylonitrile (weight average molecular weight 610,000, supplied by Aldrich) as the polymer A, 45 g of dimethyl sulfoxide as organic solvent, and 2.5 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved completely. After cooling the liquid down to room temperature, 50 g of ion-exchanged water, used as poor solvent, was dropped through a liquid feeding pump at a rate of 0.41 g/min while stirring it at 450 rpm. The liquid turned to white when 12 g of the ion-exchanged water had been added. After adding all volume of the ion-exchanged water, stirring was continued for 30 minutes, and the resulting suspension liquid was filtered, washed with 100 g of ion-exchanged water, and vacuum-dried at 80° C. for 10 hours, thereby providing 2.0 g of a white solid. The powder thus prepared was fine particles in a perfect spherical shape when observed by scanning electron microscopy. They were fine particles of polyacrylonitrile with an average particle diameter of 16.8 μm and a particle diameter distribution index of 1.15. It was impossible to observe the heat of fusion of the polyacrylonitrile used in this Example, and this polymer had a SP value of 29.5 $(J/cm^3)^{1/2}$ as estimated by the calculation-based method. Elsewhere, the polymer A and the polymer B were dissolved in this organic solvent and left to stand. Observation showed that the liquid was separated into two phases, i.e., the polymer A phase and the polymer B phase. The solubility (at room temperature) of the polyacrylonitrile in water, i.e., a poor solvent, was 0.1 mass % or less.

Example 12

Production Method 2 for Fine Polyamide Particles

A 2.1 g quantity of amorphous polyamide (weight average molecular weight 12,300, Grilamide (registered trademark) TR90, supplied by EMS Werke, Inc.) as the polymer A, 25.8 g of formic acid (supplied by Wako Pure Chemical Industries, Ltd.) as organic solvent, and 2.1 g of polyvinyl alcohol (supplied by Nippon Synthetic Chemical Industry Co., Ltd., Gohsenol (registered trademark) GM-14, weight average molecular weight 22,000, SP value 32.8 $(J/cm^3)^{1/2}$) as the polymer B were put in a 100 ml four-neck flask, heated at 80° C., and stirred until the polymer dissolved. After cooling the liquid down to room temperature, 60 g of ion-exchanged water, used as poor solvent, started to be dropped through a liquid feeding pump at a rate of 0.05 g/min while stirring it at 900 rpm. Dropping was continues at an increasing dropping rate, and the entire volume of water was used up in 90 minutes. The liquid turned to white when 10 g of the ion-exchanged water had been added. When a half volume of the ion-exchanged water had dropped, the liquid was heated up to 60° C., and the remaining ion-exchanged water continued to be dropped. After adding all volume of the water, stirring was continued for 30 minutes. After cooling the liquid to room temperature, the resulting suspension liquid was filtered, washed with 50 g of ion-exchanged water, and vacuum-dried at 80° C. for 10 hours, thereby providing 2.0 g of a white solid. Observation by scanning electron microscopy showed that the powder thus prepared was fine particles of amorphous polyamide with an average particle diameter of 9.2 μm and a particle diameter distribution index of 1.46. It was impossible to observe the heat of fusion of the amorphous polyamide produced in this Example, and the SP value of this polymer was determined by the calculation-based method to be 21.2 $(J/cm^3)^{1/2}$. Elsewhere, the polymer A and the polymer B were dissolved in this organic solvent and left to stand. Observation showed that the liquid was separated into two phases at a volume ratio of below 1/9 (polymer A solution phase/polymer B solution phase (ratio by volume)). The solubility (at room temperature) of this amorphous polyamide in water, i.e., a poor solvent, was 0.1 mass % or less.

Example 13

Production Method 3 for Fine Polyamide Particles

A 1.2 g quantity of polyamide (weight average molecular weight 17,000, Trogamid (registered trademark) CX7323, supplied by Degussa AG) as the polymer A, 27.6 g of formic acid as organic solvent, and 1.2 g of polyvinyl alcohol (supplied by Nippon Synthetic Chemical Industry Co., Ltd., Gohsenol (registered trademark) GM-14, SP value 32.8 $(J/cm^3)^{1/2}$) as the polymer B were put in a 100 ml four-neck flask, heated at 80° C., and stirred until the polymer dissolved. After cooling the liquid down to room temperature, 60 g of ion-exchanged water, used as poor solvent, started to be dropped through a liquid feeding pump at a rate of 0.05 g/min while stirring it adequately at 900 rpm. Dropping was continues at an increasing dropping rate, and the entire volume of water was used up in 90 minutes. The liquid turned to white when 10 g of the ion-exchanged water had been added. When a half volume of the ion-exchanged water had dropped, the liquid was heated up to 60° C., and the remaining ion-exchanged water continued to be dropped. After adding all volume of the water, stirring was continued for 30 minutes. After cooling the liquid to room temperature, the resulting suspension liquid was filtered, washed with 50 g of ion-exchanged water, and vacuum-dried at 80° C. for 10 hours, thereby providing 1.1 g of a white solid. Observation by scanning electron microscopy showed that the powder thus prepared was fine particles of polyamide with an average particle diameter of 13.4 μm and a particle diameter distribution index of 1.1. The heat of fusion of the polyamide produced in this Example was 9.4 J/g, and the SP value of this polymer was determined by the calculation-based method to be 23.3 $(J/cm^3)^{1/2}$. Elsewhere, the polymer A and the polymer B were dissolved in this organic solvent and left to stand. Observation showed that the liquid was separated into two phases at a volume ratio of below 1/9 (polymer A solution phase/polymer B solution phase (ratio by volume)). The solubility (at room temperature) of this polyamide in water, i.e., a poor solvent, was 0.1 mass % or less.

Example 14

Production Method 4 for Mixed Fine Particles of Polyamide and Epoxy Resin

A 1.2 g quantity of polyamide (weight average molecular weight 17,000, Trogamid (registered trademark) CX7323, supplied by Degussa AG) and 0.078 g of bisphenol-A type epoxy resin (jER (registered trademark) 828, supplied by Japan Epoxy Resins Co., Ltd.) as the polymer A, 0.026 g of polyamide amine (Tormide (registered trademark) #296, supplied by Fuji Kasei Kogyo Co., Ltd.) as curing agent, 27.6 g of formic acid as organic solvent, and 1.2 g of polyvinyl alcohol (supplied by Nippon Synthetic Chemical Industry Co., Ltd., Gohsenol (registered trade mark) GM-14, SP value 32.8 $(J/cm^3)^{1/2}$) as the polymer B were put in a 100 ml four-neck flask, heated at 80° C., and stirred until the polymer dissolved. After cooling the liquid down to room temperature, 60 g of ion-exchanged water, used as poor solvent, started to be dropped through a liquid feeding pump at a rate of 0.05 g/min while stirring it adequately at 900 rpm. Dropping continues at an increasing dropping rate, and the entire volume of water was used up in 90 minutes. The liquid turned to white when 10 g of the ion-exchanged water had been added. When a half volume of the ion-exchanged water had dropped, the liquid was heated up to 60° C., and the remaining water continued to be dropped. After adding all volume of the water, stirring was continued for 30 minutes. After cooling the liquid to room temperature, the resulting suspension liquid was filtered, washed with 50 g of ion-exchanged water, and vacuum-dried at 80° C. for 10 hours, thereby providing 1.1 g of a white solid. Observation by scanning electron microscopy showed that the powder thus prepared was fine particles of polyamide with an average particle diameter of 26.0 μm and a particle diameter distribution index of 1.1. The particles were subjected to qualitative analysis by infrared spectrophotometry, and a character-istic absorption peak of epoxy resin was found 828 cm$^{-1}$. The heat of fusion of the polyamide produced in this Example was 9.4 J/g, and the SP value of this polymer was determined by the calculation-based method to be 23.3 $(J/cm^3)^{1/2}$. Elsewhere, the polymer A and the polymer B were dissolved in this organic solvent and left to stand. Observation showed that the liquid was separated into two phases at a volume ratio of below 1/9 (polymer A solution phase/polymer B solution phase (ratio by volume)). For both this polyamide and bisphenol-A type epoxy resin, the solubility (at room temperature) in water, i.e., a poor solvent, was 0.1 mass % or less.

Example 15

Fine Polymer Particle Production Method Using Recycled Solvent

From the filtrate obtained in Example 5, water was distilled away in a nitrogen atmosphere at 80° C. under reduced pressure of 20 kPa. The water distillation, which was performed with a moisture meter (Model CA-06 moisture meter supplied by Mitsubishi Chemical Corporation), was continued until the water content in the liquid decreased to below 1 mass % or less. The water content measured was 0.85 mass %. Quantitative analysis for polyvinyl alcohol, i.e., the polymer B, in the residual liquid was carried out by gel permeation chromatography, showing that the concentration of polyvinyl alcohol was 5.6 mass %. A 47.1 g quantity of the residual liquid (consisting of 44.6 g of N-methyl-2-pyrolidone, and 2.5 g of polyvinyl alcohol) was put in a 100 ml flask, and 2.5 g of polyethersulfone (weight average molecular weight 67,000, Sumikaexcel (registered trademark) 5003P, supplied by Sumitomo Chemical Co., Ltd.), used as the polymer A, was added, together with 0.4 g of N-methyl-2-pyrolidone, heated at 80° C., and stirred until the polymer dissolved. After cooling the liquid down to room temperature, 50 g of ion-exchanged water, used as poor solvent, was dropped through a liquid feeding pump at a rate of 0.41 g/min while stirring it at 450 rpm. The liquid turned to white when about 12 g of the ion-exchanged water had added. The resulting suspension liquid was filtered and washed with 100 g of ion-exchanged water. The material separated was vacuum-dried at 80° C. for 10 hours, thereby providing 2.2 g of a white solid. Observation by scanning electron microscopy showed that the resulting powder was fine particles in a perfect spherical shape. They were found to be fine particles of polyethersulfone with an average particle diameter of 17.7 µm and a particle diameter distribution index of 1.08. These particles were nearly equivalent to those produced in Example 1 in terms of average particle diameter, particle diameter distribution, and yield.

Example 16

Production Method for Fine Polyamide-Imide Particles

A 2.5 g quantity of polyamide-imide (weight average molecular weight 66,000, TI 5013E-P, supplied by Toray Industries, Inc.) as the polymer A, 45 g of N-methyl-2-pyrolidone as organic solvent, and 2.5 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved completely. After cooling the liquid down to room temperature, 50 g of ion-exchanged water, used as poor solvent, was dropped through a liquid feeding pump at a rate of 0.41 g/min while stirring it at 450 rpm. The liquid turned to white when 12 g of the ion-exchanged water had been added. After adding all volume of the water, stirring was continued for 30 minutes. A 50 g quantity of ion-exchanged water was added at once, and the resulting suspension liquid was put in a centrifugal separator and subjected to centrifugal separation for 20 minutes at a force 20,000 times the gravity force, and the supernatant was removed. The resulting solid was filtered, washed with 100 g of ion-exchanged water, and vacuum-dried at 80° C. for 10 hours, thereby providing 2.2 g of a white solid. The powder thus prepared was fine particles in a perfect spherical shape when observed by scanning electron microscopy. They were fine particles of polyamide-imide with an average particle diameter of 0.5 µm and a particle diameter distribution index of 1.16. It was impossible to observe the heat of fusion of the polyamide-imide used in this Example, and this polymer had a SP value of 31.0 $(J/cm^3)^{1/2}$ as estimated by the calculation-based method. Elsewhere, the polymer A and the polymer B were dissolved in this organic solvent and left to stand. Observation showed that the liquid was separated into two phases, i.e., the polymer A phase and the polymer B phase. The solubility (at room temperature) of the polyamide-imide in water, i.e., a poor solvent, was 0.1 mass % or less.

Example 17

Production Method for Fine Polyallylate Particles

A 2.5 g quantity of polyarylate (weight average molecular weight 24,000, U-polymer U-100, supplied by Unitika Ltd.) as the polymer A, 45 g of N-methyl-2-pyrolidone as organic solvent, and 2.5 g of polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved completely. After cooling the liquid down to room temperature, 50 g of ion-exchanged water, used as poor solvent, was dropped through a liquid feeding pump at a rate of 0.41 g/min while stirring it at 450 rpm. The liquid turned to white when 12 g of the ion-exchanged water had been added. After adding all volume of the water, stirring was continued for 30 minutes. A 50 g quantity of ion-exchanged water was added at once, and the resulting suspension liquid was put in a centrifugal separator and subjected to centrifugal separation for 20 minutes at a force 20,000 times the gravity force, and the supernatant was removed. The resulting solid was filtered, washed with 100 g of ion-exchanged water, and vacuum-dried at 80° C. for 10 hours, thereby providing 2.1 g of a white solid. The powder thus prepared was fine particles in a perfect spherical shape when observed by scanning electron microscopy. They were fine particles of polyarylate with an average particle diameter of 0.6 µm and a particle diameter distribution index of 1.13. It was impossible to observe the heat of fusion of the polyarylate used in this Example, and this polymer had a SP value of 30.5 $(J/cm^3)^{1/2}$ as estimated by the calculation-based method. Elsewhere, the polymer A and the polymer B were dissolved in this organic solvent and left to stand. Observation showed that the liquid was separated into two phases, i.e., the polymer A phase and the polymer B phase. The solubility (at room temperature) of the polyallylate in water, i.e., a poor solvent, was 0.1 mass % or less.

Comparative Example 1

Particle Synthesis in Non-Phase-Separated Liquid 1

A 2.5 g quantity of polyethersulfone (weight average molecular weight 67,000, Sumikaexcel (registered trademark) 5003P, supplied by Sumitomo Chemical Co., Ltd.) as the polymer A, and 47.5 g of N-methyl-2-pyrolidone as organic solvent were put in a 100 ml four-neck flask, and stirred together for 4 hours. The polymer B was not added. The resulting liquid was in a uniform state. To this liquid, 50 g of ion-exchanged water, used as poor solvent, was dropped through a liquid feeding pump at a rate of 1 g/min. Then, bulky aggregates were formed, and stirring was stopped immediately. Particle-like material was not obtained.

Comparative Example 2

Particle Synthesis in Non-Phase-Separated Liquid 2

A 2.5 g quantity of polyethersulfone (weight average molecular weight 67,000, Sumikaexcel (registered trademark) 5003P, supplied by Sumitomo Chemical Co., Ltd.) as the polymer A, 47 g of N-methyl-2-pyrolidone as organic solvent, and 0.5 g polyvinyl alcohol (supplied by Nippon Synthetic Chemical Industry Co., Ltd., Gohsenol (registered trademark) GL-05) as the polymer B were put in a 100 ml four-neck flask, heated at 80° C., and stirred until the polymer dissolved completely. The resulting liquid was in a uniform state. To this liquid, 50 g of ion-exchanged water, used as poor solvent, was dropped through a liquid feeding pump at a rate of 0.41 g/min. The liquid turned to white and bulky polymer material was formed when about 2 g of the ion-exchanged water had been added. The resulting solid was washed and vacuum-dried at 80° C. for 10 hours, thereby providing a white solid. Observation of the resulting solid by scanning electron microscopy showed that the particle-like material of 100 µm or less was actually in a bulky form.

These polymer A and polymer B were dissolved in the organic solvent and left to stand for 3 days, but two-phase separation did not take place.

Comparative Example 3

Particle Synthesis in Non-Phase-Separated Liquid 3

A 2.5 g quantity of polyethersulfone (weight average molecular weight 67,000, Sumikaexcel (registered trademark) 5003P, supplied by Sumitomo Chemical Co., Ltd.) as the polymer A, 47 g of N-methyl-2-pyrolidone as organic solvent, and 2.5 g of octylphenoxy polyethoxyethanol (weight average molecular weight 11,200, number average molecular weight 8,000) as the polymer B were put in a 100 ml four-neck flask, heated at 80° C., and stirred until the polymer dissolved completely. The resulting liquid was in a uniform state. To this liquid, 50 g of ion-exchanged water, used as poor solvent, was dropped through a liquid feeding pump at a rate of 0.41 g/min. The liquid turned to white and bulky polymer material was formed when about 2 g of the ion-exchanged water had been added. The resulting solid was washed and vacuum-dried at 80° C. for 10 hours, thereby providing a white solid. Observation of the resulting powder by scanning electron microscopy showed that there were virtually no particles of 100 µm or less.

These polymer A and polymer B were dissolved in the organic solvent and left to stand for 3 days, but two-phase separation did not take place.

Comparative Example 4

Particles of polyethersulfone were produced according to the method described in Japanese Unexamined Patent Publication (Kokai) No. 2000-80329. A 2.0 g quantity of aromatic polyethersulfone (PES) and 38.0 g of N-methyl-2-pyrolidone were added and dissolved. Then, 10.0 g of ethanol was added and stirred to provide a uniform solution (solution A). To a flask equipped with a stirrer, 2.5 g of 10 mass % octyl phenoxy polyethoxy ethanol (weight average molecular weight of 1,200, and number average molecular weight of 800) and 37.5 g of pure water were poured and stirred to provide a uniform solution (solution B). The solution A is added to the solution B, and stirred to provide a slurry solution of PES particles. The resulting slurry solution was filtered, and the material separated was washed three times with 100 g of water. Then, it was vacuum-dried at a temperature of 80° C. to produce 1.0 g of PES particles. They had a number average particle diameter was 0.3 µm, a volume average particle diameter of 38.0 µm, and a particle diameter distribution index of 128.

INDUSTRIAL APPLICABILITY

Thus, the methods can produce fine particles with a narrow particle diameter distribution and, in particular, it serves to manufacture fine particles of polymers that have been conventionally difficult to process into such particles, or fine particles of highly heat resistant polymers. Specifically, likely applications include flash-moldable material, rapid prototyping/rapid manufacturing material, paste resin for plastic sol, powder blocking agent, powder flowability improving agent, adhesive, paint, dispersion liquid for various printing inks, lubricant, rubber compounding ingredient, polishing agent, viscosity improver, filter material/filter aid, gelatinizer, coagulation agent, additive for paints, oil absorbing material, mold releasing agent, slippage improving agent for plastic films/sheets, antiblocking agent, gloss adjusting agent, frosted finish agent, light diffusion agent, surface hardness improving agent, ductility improving material, additive for polymer alloys, various other modifying agents, spacer for liquid crystal display equipment, filler/carrier for chromatography, base material/additive for cosmetic foundation, assistant for micro-capsules, medical materials for drug delivery system/diagnostic reagents, support agent for perfume/pesticide, catalyst/carrier for chemical reactions, gas adsorption agent, sintered material for ceramic processing, standard particle material for measurement/analysis, particle material for food manufacture industry, material for powder coating, and toner for electrophotographic development. Various dyes including acidic dye, basic dye, fluorescent dye, and fluorescent brightening agent may be added during or after each processing step to produce colored fine resin particles and fine spherical cured resin particles. Such colored fine particles may be used as pigment for paints, inks, and plastics coloring agents. The aromatic polyethersulfone particle production method of the second part provides simple production processes for aromatic polyethersulfone particles and serves to produce aromatic polyethersulfone particles with a uniform particle diameter distribution. Aromatic polyethersulfone particles produced by the method can be used in producing an adhesive, paint, dispersion liquid in printing inks, light diffusion agent, spacer for liquid crystal display, delustering agent, additive for polymer alloys, carrier for various catalysts, toner for electrophotography, carrier for chromatography, automobile component, aircraft component, electronic component, base material for cosmetics, and carrier for medical products. Having a uniform particle diameter distribution, in particular, these particles can have better effects than expected, when used as material for an additive for polymer alloys, light diffusion agent, spacer for liquid crystal display, or toner.

The invention claimed is:
1. Aromatic polyethersulfone particles with a number average particle diameter of 0.1 to 50 µm and a particle diameter distribution index of 1.0 to 1.5, wherein the weight average molecular weight of the aromatic polyethersulfone in the particles is in the range of 10,000 to 500,000.

* * * * *